US012803752B2

(12) United States Patent
Wang et al.

(10) Patent No.: US 12,803,752 B2
(45) Date of Patent: Nov. 17, 2026

(54) COMMUNICATION METHOD AND APPARATUS

(71) Applicant: Huawei Technologies Co., Ltd., Shenzhen (CN)

(72) Inventors: Feng Wang, Shenzhen (CN); Xu Zhang, Beijing (CN); Lixia Xue, Beijing (CN); Zonghao Huang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 352 days.

(21) Appl. No.: 18/586,098

(22) Filed: Feb. 23, 2024

(65) Prior Publication Data

US 2024/0204960 A1 Jun. 20, 2024

Related U.S. Application Data

(63) Continuation of application No. PCT/CN2022/112097, filed on Aug. 12, 2022.

(30) Foreign Application Priority Data

Aug. 25, 2021 (CN) ......................... 202110984183.5

(51) Int. Cl.
*H04L 5/00* (2006.01)
*H04W 72/232* (2023.01)

(52) U.S. Cl.
CPC .......... *H04L 5/0053* (2013.01); *H04L 5/0094* (2013.01); *H04W 72/232* (2023.01)

(58) Field of Classification Search
None
See application file for complete search history.

(56) References Cited

U.S. PATENT DOCUMENTS

2021/0329681 A1* 10/2021 Sakhnini ............... H04W 72/23
2021/0377951 A1* 12/2021 Khoshnevisan .. H04W 72/0453
2023/0071462 A1* 3/2023 Su ......................... H04L 5/0094

FOREIGN PATENT DOCUMENTS

CN 110291833 A 9/2019
CN 111615197 A 9/2020

OTHER PUBLICATIONS

"3rd Generation Partnership Project; Technical Specification Group Radio Access Network; NR; Physical channels and modulation (Release 16)", 3GPP TS 38.211 v16.5.0 (Mar. 2021), Technical Specification, total 134 pages.

(Continued)

*Primary Examiner* — Lonnie V Sweet
(74) *Attorney, Agent, or Firm* — Slater Matsil, LLP

(57) ABSTRACT

This application provides a communication method and apparatus. The method includes: receiving, in a first control resource set or a second control resource set, first signaling from the network device, and adjusting the second control resource set based on the first signaling, where the first signaling indicates a quantity of symbols occupied by the second control resource set. Signaling that indicates a quantity of symbols of a CORESET is sent in a control resource set (for example, the first control resource set or the second control resource set). This helps implement flexible indication of a CORESET resource, so that a service requirement can be more quickly matched, and user experience can be improved.

20 Claims, 13 Drawing Sheets

(56) References Cited

OTHER PUBLICATIONS

'3rd Generation Partnership Project; Technical Specification Group Radio Access Network; NR; Physical layer procedures for control (Release 16)', 3GPP TS 38.213 V16.5.0 (Mar. 2021), Technical Specification, total 183 pages.

* cited by examiner

COMMUNICATION METHOD AND APPARATUS

CROSS-REFERENCE TO RELATED APPLICATIONS

This application is a continuation of International Application No. PCT/CN2022/112097, filed on Aug. 12, 2022, which claims priority to Chinese Patent Application No. 202110984183.5, filed on Aug. 25, 2021. The disclosures of the aforementioned applications are hereby incorporated by reference in their entireties.

TECHNICAL FIELD

This application relates to the field of communication technologies, and in particular, to a communication method and apparatus.

BACKGROUND

In a new radio (NR) system, information such as a frequency band occupied by a physical downlink control channel (PDCCH) in frequency domain and a quantity of orthogonal frequency division multiplexing (OFDM) symbols occupied in time domain is encapsulated in a control resource set (CORESET), and information such as a PDCCH start OFDM symbol number and a PDCCH monitoring periodicity is encapsulated in a search space. Each search space is associated with one CORESET. A configuration of a PDCCH can be determined by binding one CORESET and one search space.

In the NR system, a network device configures a CORESET for a terminal device through radio resource control (RRC). When configuring the CORESET through the RRC, the network device separately notifies each terminal device of the CORESET. The network device consumes long time to indicate, through RRC, a plurality of terminal devices to modify time-frequency resources occupied by the CORESETs. As a result, a service change requirement cannot be tracked in real time during CORESET adjustment, and user experience is affected.

SUMMARY

This application provides a communication method and apparatus, to resolve a problem that a network device consumes excessively long time to indicate a terminal device to modify a time-frequency resource occupied by a CORESET.

According to a first aspect, this application provides a communication method. The method may be performed by a terminal device, or may be performed by a chip or a circuit. The method includes: receiving, in a first CORESET or a second CORESET, first signaling from a network device, and adjusting the second CORESET based on the first signaling, where the first signaling indicates a quantity of symbols occupied by the second CORESET.

In this embodiment of this application, signaling that indicates a quantity of symbols of a CORESET is sent in the CORESET (for example, the first CORESET or the second CORESET). This helps implement flexible indication of a CORESET resource, so that a service requirement can be more quickly matched, and user experience can be improved. Specifically, the first signaling is detected in the first CORESET, so that complexity of mapping the first signaling can be reduced. The first signaling is monitored in the second CORESET, so that the network device can configure the first signaling more flexibly, and a cell-level or UE group-level resource may not be occupied, thereby facilitating sending of other cell-level or UE group-level signaling.

In a possible design, the adjusting the second CORESET based on the first signaling includes: determining, based on the first signaling, a quantity R of interleaving rows of the second CORESET, and/or a length L of a resource element group (REG) bundle of the second CORESET, where at least two interleaving row values are configured for the second CORESET, and/or at least two REG bundle length values are configured for the second CORESET. Resource utilization can be improved according to the foregoing design.

In a possible design, a quantity of resource blocks RBs of the second CORESET cannot be exactly divided by 12 and/or 18.

In a possible design, there is a correspondence between R and the quantity of symbols indicated by the first signaling; and/or there is a correspondence between L and the quantity of symbols indicated by the first signaling. Complexity of the terminal device can be reduced according to the foregoing design.

In a possible design, a quantity of candidate PDCCHs corresponding to at least one aggregation level is configured in a search space associated with the second CORESET, and a first aggregation level in the at least one aggregation level is corresponding to a quantity of at least two candidate PDCCHs; and/or a maximum quantity of candidate PDCCHs corresponding to at least one aggregation level is configured in a search space associated with the second CORESET. The foregoing manner facilitates better PDCCH resource allocation.

In a possible design, the first signaling may further indicate a frequency domain resource of the second CORESET. The first signaling indicates the frequency domain resource of the second CORESET, so that a smaller adjustment granularity can be implemented.

In a possible design, the first signaling may further indicate a modulation scheme of a PDCCH. For example, when channel quality is good or there is a large quantity of scheduling times, the first signaling may indicate that the modulation scheme of the PDCCH is 16 quadrature amplitude modulation (QAM). In the foregoing manner, a PDCCH capacity can be further increased, so that system performance and user experience can be improved.

In a possible design, a monitoring periodicity of the first signaling may be a PDCCH monitoring periodicity or a synchronization signal/physical broadcast channel block (SSB) periodicity indicated by a first search space, where the first search space is for monitoring a PDCCH for scheduling a system information block 1 (SIB1).

In a possible design, a second search space may be configured, and the monitoring periodicity of the first signaling may be indicated by the second search space. A periodicity indicated by the second search space is different from a periodicity indicated by the first search space.

In a possible design, the first signaling may be UE-level signaling, UE group signaling, or cell-level signaling.

In a possible design, the adjusting the second CORESET based on the first signaling includes: adjusting, starting from a first slot, a quantity of symbols of the second CORESET to the quantity of symbols indicated by the first signaling, where the first slot is a slot in which the first signaling is received. The foregoing can improve communication timeliness.

In a possible design, the first signaling occupies one symbol in time domain, and the first signaling indicates that the quantity of symbols occupied by the second CORESET is 1; and after the quantity of symbols of the second CORESET is adjusted to the quantity of symbols indicated by the first signaling, the method further includes: renumbering other REGs other than a first resource in the adjusted second CORESET, where the first resource is a REG occupied by the first signaling. According to the foregoing design, conflicts between the first signaling and another signal in the second CORESET can be reduced, and resource utilization can be improved.

In a possible design, the first signaling occupies one symbol in time domain, and the first signaling indicates that the quantity of symbols occupied by the second CORESET is greater than 1. After the quantity of symbols of the second CORESET is adjusted to the quantity of symbols indicated by the first signaling, the method further includes: numbering other REGs other than a second resource in the adjusted second CORESET, where the second resource is the same as a resource occupied by the first signaling in frequency domain, and the second resource is the same as a symbol occupied by the adjusted second CORESET in time domain; or numbering other REGs other than a first resource in the adjusted second CORESET, where the first resource is a REG occupied by the first signaling. According to the foregoing design, conflicts between the first signaling and another signal in the second CORESET can be reduced, and resource utilization can be improved.

In a possible design, when the other REGs other than the first resource in the adjusted second CORESET are numbered, m REGs in the other REGs other than the first resource in the second resource do not participate in the numbering, where m is a remainder obtained by performing a modulo operation on a quantity of the other REGs other than the first resource in the second resource by the length of the REG bundle. According to the foregoing design, conflicts between the first signaling and another signal in the second CORESET can be reduced, and resource utilization can be improved.

In a possible design, the first signaling includes N pieces of sub information, each piece of sub information occupies M RBs in the second CORESET, a minimum identifier of an RB occupied by each piece of sub information is an integer multiple of p, M is an integer multiple of p, p is an integer greater than 1, a quantity of symbols of the first signaling is different from the quantity of symbols of the second CORESET, and N is an integer greater than 1.

In a possible design, a quantity of symbols occupied by the first signaling in time domain is the same as the quantity of symbols of the second CORESET, and the quantity of symbols indicated by the first signaling is less than the quantity of symbols occupied by the first signaling in time domain. After the quantity of symbols of the second CORESET is adjusted to the quantity of symbols indicated by the first signaling, the method further includes: renumbering other CCEs other than a third resource in the second CORESET, where the third resource is a CCE occupied by the first signaling. According to the foregoing design, conflicts between the first signaling and another signal in the second CORESET can be reduced, and the resource utilization can be improved.

In a possible design, the adjusting the second CORESET based on the first signaling includes: adjusting, starting from a next slot of a first slot, a quantity of symbols of the second CORESET to the quantity of symbols indicated by the first signaling, where the first slot is a slot in which the first signaling is received. Complexity can be reduced according to the foregoing design.

In a possible design, the first signaling is scrambled by using a first radio network temporary identifier (RNTI), and the first RNTI is an RNTI corresponding to the first signaling. In the foregoing implementation, the first signaling can be distinguished from other signaling, so that reliability of indicating a quantity of symbols of a CORESET can be improved.

In a possible design, the first CORESET is a common CORESET, and the second CORESET is a terminal device-specific CORESET; an identifier of the first CORESET is 0, and an identifier of the second CORESET is greater than 0; the second CORESET is a CORESET configured by using terminal device-specific signaling, and the first CORESET is a CORESET configured by using a physical broadcast channel or system information; or the first CORESET is for monitoring a PDCCH in an idle state, and the second CORESET is for monitoring a PDCCH in a non-idle state.

According to a second aspect, this application provides a communication method. The method may be performed by a network device, or may be performed by a chip or a circuit. The method includes: sending, in a first CORESET or a second CORESET, first signaling to a terminal device, where the first signaling indicates a first quantity of symbols occupied by the second CORESET; and adjusting the second CORESET based on the first quantity of symbols.

In this embodiment of this application, signaling that indicates a quantity of symbols of a CORESET is sent in the CORESET (for example, the first CORESET or the second CORESET). This helps implement flexible indication of a CORESET resource, so that a service requirement can be more quickly matched, and user experience can be improved. Specifically, the first signaling is detected in the first CORESET, so that complexity of mapping the first signaling can be reduced. The first signaling is monitored in the second CORESET, so that the network device can configure the first signaling more flexibly, and a cell-level or UE group-level resource may not be occupied, thereby facilitating sending of other cell-level or UE group-level signaling.

In a possible design, the adjusting the second CORESET based on the first signaling includes: determining, based on configuration information, a quantity R of interleaving rows of the second CORESET, and/or a length L of a REG bundle of the second CORESET, where at least two interleaving row values are configured for the second CORESET, and/or at least two REG bundle length values are configured for the second CORESET. Resource utilization can be improved according to the foregoing design.

In a possible design, a quantity of resource blocks RBs of the second CORESET cannot be exactly divided by 12 and/or 18.

In a possible design, there is a correspondence between the at least two interleaving row values and a quantity of symbols of the second CORESET; and/or there is a correspondence between the at least two REG bundle length values and the quantity of symbols of the second CORESET. Complexity of the terminal device can be reduced according to the foregoing design.

In a possible design, a quantity of candidate PDCCHs corresponding to at least one aggregation level is configured in a search space associated with the second CORESET, and a first aggregation level in the at least one aggregation level is corresponding to a quantity of at least two candidate PDCCHs; and/or a maximum quantity of candidate PDCCHs corresponding to at least one aggregation level is configured in a search space associated with the second CORESET. The foregoing manner facilitates better PDCCH resource allocation.

In a possible design, the first signaling may further indicate a frequency domain resource of the second CORESET. The first signaling indicates the frequency domain resource of the second CORESET, so that a smaller adjustment granularity can be implemented.

In a possible design, the first signaling may further indicate a modulation scheme of a PDCCH. For example, when channel quality is good or there is a large quantity of scheduling times, the first signaling may indicate that the modulation scheme of the PDCCH is 16QAM. In the foregoing manner, a PDCCH capacity can be further increased, so that system performance and user experience can be improved.

In a possible design, a monitoring periodicity of the first signaling may be a PDCCH monitoring periodicity or an SSB periodicity indicated by a first search space, where the first search space is for monitoring a PDCCH for scheduling a SIB1.

In a possible design, a second search space may be configured, and the monitoring periodicity of the first signaling may be indicated by the second search space. A periodicity indicated by the second search space is different from a periodicity indicated by the first search space.

In a possible design, the first signaling may be UE-level signaling, UE group signaling, or cell-level signaling.

In a possible design, the adjusting the second CORESET based on the first signaling includes: adjusting, starting from a first slot, a quantity of symbols of the second CORESET to the quantity of symbols indicated by the first signaling, where the first slot is a slot in which the first signaling is received. The foregoing can improve communication reliability.

In a possible design, the first signaling occupies one symbol in time domain, and the first signaling indicates that the quantity of symbols occupied by the second CORESET is 1; and after the quantity of symbols of the second CORESET is adjusted to the quantity of symbols indicated by the first signaling, the method further includes: renumbering other REGs other than a first resource in the adjusted second CORESET, where the first resource is a REG occupied by the first signaling. According to the foregoing design, conflicts between the first signaling and another signal in the second CORESET can be reduced, and resource utilization can be improved.

In a possible design, the first signaling occupies one symbol in time domain, and the first signaling indicates that the quantity of symbols occupied by the second CORESET is greater than 1. After the quantity of symbols of the second CORESET is adjusted to the quantity of symbols indicated by the first signaling, the method further includes: numbering other REGs other than a second resource in the adjusted second CORESET, where the second resource is the same as a resource occupied by the first signaling in frequency domain, and the second resource is the same as a symbol occupied by the adjusted second CORESET in time domain; or numbering other REGs other than a first resource in the adjusted second CORESET, where the first resource is a REG occupied by the first signaling. According to the foregoing design, conflicts between the first signaling and another signal in the second CORESET can be reduced, and the resource utilization can be improved.

In a possible design, when the other REGs other than the first resource in the adjusted second CORESET are numbered, m REGs in the other REGs other than the first resource in the second resource do not participate in the numbering, where m is a remainder obtained by performing a modulo operation on a quantity of the other REGs other than the first resource in the second resource by the length of the REG bundle. According to the foregoing design, conflicts between the first signaling and another signal in the second CORESET can be reduced, and the resource utilization can be improved.

In a possible design, the first signaling includes N pieces of sub information, each piece of sub information occupies M RBs in the second CORESET, a minimum identifier of an RB occupied by each piece of sub information is an integer multiple of p, M is an integer multiple of p, p is an integer greater than 1, a quantity of symbols of the first signaling is different from the quantity of symbols of the second CORESET, and N is an integer greater than 1.

In a possible design, a quantity of symbols occupied by the first signaling in time domain is the same as the quantity of symbols of the second CORESET, and the quantity of symbols indicated by the first signaling is less than the quantity of symbols occupied by the first signaling in time domain. After the quantity of symbols of the second CORESET is adjusted to the quantity of symbols indicated by the first signaling, the method further includes: renumbering other CCEs other than a third resource in the second CORESET, where the third resource is a CCE occupied by the first signaling. According to the foregoing design, conflicts between the first signaling and another signal in the second CORESET can be reduced, and the resource utilization can be improved.

In a possible design, the adjusting the second CORESET based on the first signaling includes: adjusting, starting from a next slot of a first slot, a quantity of symbols of the second CORESET to the quantity of symbols indicated by the first signaling, where the first slot is a slot in which the first signaling is received. Complexity can be reduced according to the foregoing design.

In a possible design, the first signaling is scrambled by using a first RNTI, and the first RNTI is an RNTI corresponding to the first signaling. In the foregoing implementation, the first signaling can be distinguished from other signaling, so that reliability of indicating a quantity of symbols of a CORESET can be improved.

In a possible design, the first CORESET is a common CORESET, and the second CORESET is a terminal device-specific CORESET; an identifier of the first CORESET is 0, and an identifier of the second CORESET is greater than 0; the second CORESET is a CORESET configured by using terminal device-specific signaling, and the first CORESET is a CORESET configured by using a physical broadcast channel or system information; or the first CORESET is for monitoring a PDCCH in an idle state, and the second CORESET is for monitoring a PDCCH in a non-idle state.

According to a third aspect, this application provides a communication method. The method may be performed by a terminal device, or may be performed by a chip or a circuit. The method includes: receiving, in a first CORESET or a second CORESET, first signaling from a network device, where the first signaling indicates a resource that overlaps the first CORESET and that is in the second CORESET is unavailable. A REG, a REG bundle, or a control channel element (CCE) that does not overlap the first CORESET and that is in the second CORESET is renumbered.

In this embodiment of this application, the REG, the REG bundle, or the CCE is renumbered, so that resource utilization of the interleaved second CORESET can be improved.

The first signaling is detected in the first CORESET, so that complexity of mapping the first signaling can be reduced. The first signaling is monitored in the second CORESET, so that the network device can configure the first signaling more flexibly, and a cell-level or UE group-level resource may not be occupied, thereby facilitating sending of other cell-level or UE group-level signaling.

In a possible design, the first signaling is scrambled by using a first RNTI, and the first RNTI is an RNTI corresponding to the first signaling. In the foregoing implementation, the first signaling can be distinguished from other signaling, so that reliability of indicating a quantity of symbols of a CORESET can be improved.

In a possible design, the renumbering a REG bundle that does not overlap the first CORESET and that is in the second CORESET includes: renumbering, based on the quantity R of interleaving rows and the length L of the REG bundle, the REG bundle that does not overlap the first CORESET and that is in the second CORESET, where $$\frac{N_{REG}^{CORESET}}{L \times R}$$

is an integer, $$N_{REG}^{CORESET}$$

is a total quantity of REGs of the REG bundle that does not overlap the first CORESET and that is in the second CORESET, the at least two interleaving row values are configured for the second CORESET, and/or the at least two REG bundle length values are configured for the second CORESET. Resource utilization can be improved according to the foregoing design.

In a possible design, the renumbering a REG bundle that does not overlap the first CORESET and that is in the second CORESET includes: renumbering the REG bundle that does not overlap the first CORESET and that is in the second CORESET, and skipping n REG bundles during the renumbering, where $$\frac{N_{REG}^{CORESET'}}{L \times R}$$

is an integer, $$N_{REG}^{CORESET'}$$

is a quantity of remaining REGs other than the n REG bundles in a first REG bundle, and the first REG bundle is the REG bundle that does not overlap the first CORESET and that is in the second CORESET. The resource utilization can be improved according to the foregoing design.

In a possible design, the first CORESET is a common CORESET, and the second CORESET is a terminal device-specific CORESET; an identifier of the first CORESET is 0, and an identifier of the second CORESET is greater than 0; the second CORESET is a CORESET configured by using terminal device-specific signaling, and the first CORESET is a CORESET configured by using a physical broadcast channel or system information; or the first CORESET is for monitoring a PDCCH in an idle state, and the second CORESET is for monitoring a PDCCH in a non-idle state.

According to a fourth aspect, this application provides a communication method. The method may be performed by a network device, or may be performed by a chip or a circuit. The method includes: sending, in a first CORESET or a second CORESET, first signaling to a terminal device, where the first signaling indicates a resource that overlaps the first CORESET and that is in the second CORESET is unavailable. A REG, a REG bundle, or a CCE that does not overlap the first CORESET and that is in the second CORESET is renumbered.

In this embodiment of this application, the REG, the REG bundle, or the CCE is renumbered, so that resource utilization of the interleaved second CORESET can be improved. The first signaling is detected in the first CORESET, so that complexity of mapping the first signaling can be reduced. The first signaling is monitored in the second CORESET, so that the network device can configure the first signaling more flexibly, and a cell-level or UE group-level resource may not be occupied, thereby facilitating sending of other cell-level or UE group-level signaling.

In a possible design, the first signaling is scrambled by using a first RNTI, and the first RNTI is an RNTI corresponding to the first signaling. In the foregoing implementation, the first signaling can be distinguished from other signaling, so that reliability of indicating a quantity of symbols of a CORESET can be improved.

In a possible design, the renumbering a REG bundle that does not overlap the first CORESET and that is in the second CORESET includes: renumbering, based on the quantity R of interleaving rows and the length L of the REG bundle, the REG bundle that does not overlap the first CORESET and that is in the second CORESET, where $$\frac{N_{REG}^{CORESET}}{L \times R}$$

is an integer, $$N_{REG}^{CORESET}$$

is a total quantity of REGs of the REG bundle that does not overlap the first CORESET and that is in the second CORESET, the at least two interleaving row values are configured for the second CORESET, and/or the at least two REG bundle length values are configured for the second CORESET. Resource utilization can be improved according to the foregoing design.

In a possible design, the renumbering a REG bundle that does not overlap the first CORESET and that is in the second CORESET includes: renumbering the REG bundle that does not overlap the first CORESET and that is in the second CORESET, and skipping n REG bundles during the renumbering, where $$\frac{N_{REG}^{CORESET'}}{L \times R}$$

is an integer, $$N_{REG}^{CORESET'}$$

is a quantity of remaining REGs other than the n REG bundles in a first REG bundle, and the first REG bundle is the REG bundle that does not overlap the first CORESET and that is in the second CORESET. The resource utilization can be improved according to the foregoing design.

In a possible design, the first CORESET is a common CORESET, and the second CORESET is a terminal device-specific CORESET; an identifier of the first CORESET is 0, and an identifier of the second CORESET is greater than 0; the second CORESET is a CORESET configured by using terminal device-specific signaling, and the first CORESET is a CORESET configured by using a physical broadcast channel or system information; or the first CORESET is for monitoring a PDCCH in an idle state, and the second CORESET is for monitoring a PDCCH in a non-idle state.

According to a fifth aspect, this application provides a communication method. The method may be performed by a terminal device, or may be performed by a chip or a circuit. The method includes: receiving, in a first CORESET or a second CORESET, first signaling from a network device, where the first signaling indicates to monitor one of the second CORESET and a third CORESET, the second CORESET overlaps the first CORESET, and the third CORESET does not overlap the first CORESET. A CORESET is detected based on the first signaling.

According to the foregoing design, conflicts between the first CORESET and the second CORESET can be reduced, and resource utilization and communication reliability can be improved. The first signaling is monitored in the second CORESET, so that the network device can configure the first signaling more flexibly, and a cell-level or UE group-level resource may not be occupied, thereby facilitating sending of other cell-level or UE group-level signaling.

In a possible design, the first signaling is scrambled by using a first RNTI, and the first RNTI is an RNTI corresponding to the first signaling. In the foregoing implementation, the first signaling can be distinguished from other signaling, so that reliability of indicating a quantity of symbols of a CORESET can be improved.

In a possible design, the first CORESET is a common CORESET, and the second CORESET is a terminal device-specific CORESET; an identifier of the first CORESET is 0, and an identifier of the second CORESET is greater than 0; the second CORESET is a CORESET configured by using terminal device-specific signaling, and the first CORESET is a CORESET configured by using a physical broadcast channel or system information; or the first CORESET is for monitoring a PDCCH in an idle state, and the second CORESET is for monitoring a PDCCH in a non-idle state.

According to a sixth aspect, this application provides a communication method. The method may be performed by a network device, or may be performed by a chip or a circuit. The method includes: sending, in a first CORESET or a second CORESET, first signaling to a terminal device, where the first signaling indicates to monitor one of the second CORESET and a third CORESET, the second CORESET overlaps the first CORESET, and the third CORESET does not overlap the first CORESET.

According to the foregoing design, conflicts between the first CORESET and the second CORESET can be reduced, and resource utilization and communication reliability can be improved. The first signaling is monitored in the second CORESET, so that the network device can configure the first signaling more flexibly, and a cell-level or UE group-level resource may not be occupied, thereby facilitating sending of other cell-level or UE group-level signaling.

In a possible design, if the first CORESET is not used, the first signaling indicates to monitor the second CORESET; or if the first CORESET is used, the first signaling indicates to monitor the third CORESET.

In a possible design, the first signaling is scrambled by using a first RNTI, and the first RNTI is an RNTI corresponding to the first signaling. In the foregoing implementation, the first signaling can be distinguished from other signaling, so that reliability of indicating a quantity of symbols of a CORESET can be improved.

In a possible design, the first CORESET is a common CORESET, and the second CORESET is a terminal device-specific CORESET; an identifier of the first CORESET is 0, and an identifier of the second CORESET is greater than 0; the second CORESET is a CORESET configured by using terminal device-specific signaling, and the first CORESET is a CORESET configured by using a physical broadcast channel or system information; or the first CORESET is for monitoring a PDCCH in an idle state, and the second CORESET is for monitoring a PDCCH in a non-idle state.

According to a seventh aspect, this application further provides a communication apparatus. The communication apparatus has a function of implementing any method provided in the first aspect, the third aspect, or the fifth aspect. The communication apparatus may be implemented by hardware, or may be implemented by executing corresponding software by hardware. The hardware or the software includes one or more elements or modules corresponding to the foregoing function.

In a possible design, the communication apparatus includes a processor. The processor is configured to support the communication apparatus in performing a corresponding function of the terminal device in the foregoing method. The communication apparatus may further include a memory. The memory may be coupled to the processor, and the memory stores program instructions and data that are necessary for the communication apparatus. Optionally, the communication apparatus further includes an interface circuit. The interface circuit is configured to support communication between the communication apparatus and a device, for example, a network device.

For example, the communication apparatus has a function of implementing the method provided in the first aspect. The processor may be configured to: receive, in a first CORESET or a second CORESET, first signaling from the network device through the interface circuit, and adjust the second CORESET based on the first signaling, where the first signaling indicates a quantity of symbols occupied by the second CORESET.

Optionally, the processor may be specifically configured to determine a quantity R of interleaving rows of the second CORESET and/or a length L of a REG bundle of the second CORESET based on the first signaling, where at least two interleaving row values are configured for the second CORESET, and/or at least two REG bundle length values are configured for the second CORESET.

Optionally, the processor may be further configured to adjust, starting from a first slot, a quantity of symbols of the second CORESET to the quantity of symbols indicated by the first signaling, where the first slot is a slot in which the first signaling is received.

Optionally, the first signaling occupies one symbol in time domain, and the first signaling indicates that the quantity of symbols occupied by the second CORESET is 1. The processor may be further configured to: after the quantity of symbols of the second CORESET is adjusted to the quantity of symbols indicated by the first signaling, renumber other REGs other than a first resource in the adjusted second CORESET, where the first resource is a REG occupied by the first signaling.

Optionally, the first signaling occupies one symbol in time domain, and the first signaling indicates that a quantity of symbols occupied by the second CORESET is greater than 1. The processor may be further configured to: after the quantity of symbols of the second CORESET is adjusted to the quantity of symbols indicated by the first signaling, number other REGs other than a second resource in the adjusted second CORESET, where the second resource is the same as a resource occupied by the first signaling in frequency domain, and the second resource is the same as a symbol occupied by the adjusted second CORESET in time domain; or number other REGs other than a first resource in the adjusted second CORESET, where the first resource is a REG occupied by the first signaling.

Optionally, the processor may be specifically configured to adjust, starting from a next slot of a first slot, a quantity of symbols of the second CORESET to the quantity of symbols indicated by the first signaling, where the first slot is the slot in which the first signaling is received.

For another example, the communication apparatus has a function of implementing the method provided in the third aspect. The processor may be configured to receive, in a first CORESET or a second CORESET, first signaling from a network device through the interface circuit, where the first signaling indicates a resource that overlaps the first CORESET and that is in the second CORESET is unavailable. A REG, a REG bundle, or a CCE that does not overlap the first CORESET and that is in the second CORESET is renumbered.

Optionally, when renumbering the REG bundle that does not overlap the first CORESET and that is in the second CORESET, the processor may be specifically configured to renumber the REG bundle that does not overlap the first CORESET and that is in the second CORESET, including: renumbering, based on the quantity R of interleaving rows and the length L of the REG bundle, the REG bundle that does not overlap the first CORESET and that is in the second CORESET, where $$\frac{N_{REG}^{CORESET}}{L \times R}$$

is an integer, $$N_{REG}^{CORESET}$$

is a total quantity of REGs of the REG bundle that does not overlap the first CORESET and that is in the second CORESET, the at least two interleaving row values are configured for the second CORESET, and/or the at least two REG bundle length values are configured for the second CORESET.

Optionally, when renumbering the REG bundle that does not overlap the first CORESET and that is in the second CORESET, the processor may be specifically configured to: renumber the REG bundle that does not overlap the first CORESET and that is in the second CORESET, and skip n REG bundles during the renumbering, where $$\frac{N_{REG}^{CORESET'}}{L \times R}$$

is an integer, $$N_{REG}^{CORESET'}$$

is a quantity of remaining REGs other than the n REG bundles in a first REG bundle, VREG and the first REG bundle is the REG bundle that does not overlap the first CORESET and that is in the second CORESET.

For another example, the communication apparatus has a function of implementing the method provided in the fifth aspect. The processor may be configured to receive, in a first CORESET or a second CORESET, first signaling from a network device through the interface circuit, where the first signaling indicates to monitor one of the second CORESET and a third CORESET, where the second CORESET overlaps the first CORESET, and the third CORESET does not overlap the first CORESET. A CORESET is detected based on the first signaling.

In a possible design, the communication apparatus includes corresponding function modules, which are respectively configured to implement the steps in the foregoing method. The function may be implemented by hardware, or may be implemented by executing corresponding software by hardware. The hardware or software includes one or more modules corresponding to the foregoing functions.

In a possible design, a structure of the communication apparatus includes a processing unit (or a processing module) and a communication unit (or a communication module). These units may perform corresponding functions in the foregoing method example. For details, refer to the descriptions in the method provided in the first aspect. Details are not described herein again.

For example, the communication apparatus has a function of implementing the method provided in the first aspect. The processing module is configured to receive, in a first CORESET or a second CORESET, first signaling from a network device through the communication module, and adjust the second CORESET based on the first signaling, where the first signaling indicates a quantity of symbols occupied by the second CORESET.

Optionally, the processing module may be specifically configured to determine, based on the first signaling, a quantity R of interleaving rows of the second CORESET, and/or a length L of a REG bundle of the second CORESET, where at least two interleaving row values are configured for the second CORESET, and/or at least two REG bundle length values are configured for the second CORESET.

Optionally, the processing module may be further configured to adjust, starting from a first slot, a quantity of symbols of the second CORESET to the quantity of symbols indicated by the first signaling, where the first slot is the slot in which the first signaling is received.

Optionally, the first signaling occupies one symbol in time domain, and the first signaling indicates that the quantity of symbols occupied by the second CORESET is 1. The processing module may be further configured to: after the quantity of symbols of the second CORESET is adjusted to the quantity of symbols indicated by the first signaling, renumber other REGs other than a first resource in the adjusted second CORESET, where the first resource is a REG occupied by the first signaling.

Optionally, the first signaling occupies one symbol in time domain, and the first signaling indicates that the quantity of symbols occupied by the second CORESET is greater than 1. The processing module may be further configured to: after the quantity of symbols of the second CORESET is adjusted to the quantity of symbols indicated by the first signaling, number the other REGs other than the second resource in the adjusted second CORESET, where the second resource is the same as a resource occupied by the first signaling in frequency domain, and the second resource is the same as a symbol occupied by the adjusted second CORESET in time domain; or number other REGs other than a first resource in the adjusted second CORESET, where the first resource is the REG occupied by the first signaling.

Optionally, the processing module may be specifically configured to adjust, starting from a next slot of a first slot, a quantity of symbols of the second CORESET to the quantity of symbols indicated by the first signaling, where the first slot is the slot in which the first signaling is received.

For another example, the communication apparatus has a function of implementing the method provided in the third aspect. The processing module is configured to receive, in a first CORESET or a second CORESET, first signaling from a network device through the communication module, where the first signaling indicates a resource that overlaps the first CORESET and that is in the second CORESET is unavailable. A REG, a REG bundle, or a CCE that does not overlap the first CORESET and that is in the second CORESET is renumbered.

Optionally, when renumbering the REG bundle that does not overlap the first CORESET and that is in the second CORESET, the processing module may be specifically configured to renumber the REG bundle that does not overlap the first CORESET and that is in the second CORESET, including: renumbering, based on the quantity R of interleaving rows and the length L of the REG bundle, the REG bundle that does not overlap the first CORESET and that is in the second CORESET, where $$\frac{N_{REG}^{CORESET}}{L \times R}$$

is an integer, $$N_{REG}^{CORESET}$$

is a total quantity of REGs of the REG bundle that does not overlap the first CORESET and that is in the second CORESET, the at least two interleaving row values are configured for the second CORESET, and/or the at least two REG bundle length values are configured for the second CORESET.

Optionally, when renumbering the REG bundle that does not overlap the first CORESET and that is in the second CORESET, the processing module may be specifically configured to: renumber the REG bundle that does not overlap the first CORESET and that is in the second CORESET, and skip n REG bundles during the renumbering, where $$\frac{N_{REG}^{CORESET'}}{L \times R}$$

is an integer, $$N_{REG}^{CORESET'}$$

is a quantity of remaining REGs other than the n REG bundles in a first REG VREG bundle, and the first REG bundle is the REG bundle that does not overlap the first CORESET and that is in the second CORESET.

For another example, the communication apparatus has a function of implementing the method provided in the fifth aspect. The processing module is configured to receive, in a first CORESET or a second CORESET, first signaling from a network device through the communication module, where the first signaling indicates to monitor one of the second CORESET and the third CORESET, the second CORESET overlaps the first CORESET, and the third CORESET does not overlap the first CORESET. The CORESET is detected based on the first signaling.

According to an eighth aspect, this application further provides a communication apparatus. The communication apparatus has a function of implementing any method provided in the second aspect, the fourth aspect, or the sixth aspect. The communication apparatus may be implemented by hardware, or may be implemented by executing corresponding software by hardware. The hardware or the software includes one or more elements or modules corresponding to the foregoing function.

In a possible design, the communication apparatus includes a processor. The processor is configured to support the communication apparatus in performing a corresponding function of a network device in the foregoing method. The communication apparatus may further include a memory. The memory may be coupled to the processor, and the memory stores program instructions and data that are necessary for the communication apparatus. Optionally, the communication apparatus further includes an interface circuit. The interface circuit is configured to support communication between the communication apparatus and a device, for example, a terminal device.

For example, the communication apparatus has a function of implementing the method provided in the second aspect. The processor may be configured to: send, in a first CORESET or a second CORESET, first signaling to the terminal device through the interface circuit, where the first signaling indicates a first quantity of symbols occupied by the second CORESET; and adjust the second CORESET based on the first quantity of symbols.

Optionally, the processor is specifically configured to determine, based on configuration information, a quantity R of interleaving rows of the second CORESET, and/or a length L of a REG bundle of the second CORESET, where at least two interleaving row values are configured for the second CORESET, and/or at least two REG bundle length values are configured for the second CORESET.

Optionally, the processor is specifically configured to adjust, starting from a first slot, a quantity of symbols of the second CORESET to the quantity of symbols indicated by the first signaling, where the first slot is a slot in which the first signaling is received.

Optionally, the first signaling occupies one symbol in time domain, and the first signaling indicates that the quantity of symbols occupied by the second CORESET is 1. The processor is further configured to: after the quantity of symbols of the second CORESET is adjusted to the quantity of symbols indicated by the first signaling, renumber other REGs other than a first resource in the adjusted second CORESET, where the first resource is a REG occupied by the first signaling.

Optionally, the first signaling occupies one symbol in time domain, and the first signaling indicates that the quantity of symbols occupied by the second CORESET is greater than 1. The processor is further configured to: after the quantity of symbols of the second CORESET is adjusted to the quantity of symbols indicated by the first signaling, number other REGs other than a second resource in the adjusted second CORESET, where the second resource is the same as a resource occupied by the first signaling in frequency domain, and the second resource is the same as a symbol occupied by the adjusted second CORESET in time domain; or number other REGs other than a first resource in the adjusted second CORESET, where the first resource is a REG occupied by the first signaling.

Optionally, the processor is specifically configured to adjust, starting from a next slot of a first slot, a quantity of symbols of the second CORESET to the quantity of symbols indicated by the first signaling, where the first slot is the slot in which the first signaling is received.

For another example, the communication apparatus has a function of implementing the method provided in the fourth aspect. The processor may be configured to send, in a first CORESET or a second CORESET, first signaling to a terminal device through the interface circuit, where the first signaling indicates a resource that overlaps the first CORESET and that is in the second CORESET is unavailable. A REG, a REG bundle, or a CCE that does not overlap the first CORESET and that is in the second CORESET is renumbered.

Optionally, when renumbering the REG bundle that does not overlap the first CORESET and that is in the second CORESET, the processor is specifically configured to renumber the REG bundle that does not overlap the first CORESET and that is in the second CORESET, including: renumbering, based on the quantity R of interleaving rows and the length L of the REG bundle, the REG bundle that does not overlap the first CORESET and that is in the second CORESET, where $$\frac{N_{REG}^{CORESET}}{L \times R}$$

is an integer, $$N_{REG}^{CORESET}$$

is a total quantity of REGs of the REG bundle that does not overlap the first CORESET and that is in the second CORESET, the at least two interleaving row values are configured for the second CORESET, and/or the at least two REG bundle length values are configured for the second CORESET.

Optionally, in a possible design, when renumbering the REG bundle that does not overlap the first CORESET and that is in the second CORESET, the processor is specifically configured to: renumber the REG bundle that does not overlap the first CORESET and that is in the second CORESET, and skip n REG bundles during the renumbering, where $$\frac{N_{REG}^{CORESET'}}{L \times R}$$

is an integer, $$N_{REG}^{CORESET'}$$

is a quantity of remaining REGs other than the n REG bundles in a first REG bundle, and the first REG bundle is the REG bundle that does not overlap the first CORESET and that is in the second CORESET.

For another example, the communication apparatus has a function of implementing the method provided in the sixth aspect. The processor may be configured to send, in a first CORESET or a second CORESET, first signaling to a terminal device through the interface circuit, where the first signaling indicates to monitor one of the second CORESET and a third CORESET, the second CORESET overlaps the first CORESET, and the third CORESET does not overlap the first CORESET.

In a possible design, the communication apparatus includes corresponding function modules, which are respectively configured to implement the steps in the foregoing method. The function may be implemented by hardware, or may be implemented by executing corresponding software by hardware. The hardware or software includes one or more modules corresponding to the foregoing functions.

In a possible design, a structure of the communication apparatus includes a processing unit (or a processing module) and a communication unit (or a communication module). These units may perform corresponding functions in the foregoing method example. For details, refer to the descriptions in the method provided in the second aspect. Details are not described herein again.

For example, the communication apparatus has a function of implementing the method provided in the second aspect. The processing module is configured to: send, in a first CORESET or a second CORESET, first signaling to a terminal device through the communication module, where the first signaling indicates a first quantity of symbols occupied by the second CORESET; and adjust the second CORESET based on the first quantity of symbols.

Optionally, the processing module is specifically configured to determine, based on the configuration information, a quantity R of interleaving rows of the second CORESET, and/or a length L of a REG bundle of the second CORESET, where at least two interleaving row values are configured for the second CORESET, and/or at least two REG bundle length values are configured for the second CORESET.

Optionally, the processing module is specifically configured to adjust, starting from a first slot, a quantity of symbols of the second CORESET to the quantity of symbols indicated by the first signaling, where the first slot is a slot in which the first signaling is received.

Optionally, the first signaling occupies one symbol in time domain, and the first signaling indicates that the quantity of symbols occupied by the second CORESET is 1. The processing module is further configured to: after the quantity of symbols of the second CORESET is adjusted to the quantity of symbols indicated by the first signaling, renumber other REGs other than a first resource in the adjusted second CORESET, where the first resource is a REG occupied by the first signaling.

Optionally, the first signaling occupies one symbol in time domain, and the first signaling indicates that the quantity of symbols occupied by the second CORESET is greater than 1. The processing module is further configured to: after the quantity of symbols of the second CORESET is adjusted to the quantity of symbols indicated by the first signaling, number other REGs other than a second resource in the adjusted second CORESET, where the second resource is the same as a resource occupied by the first signaling in frequency domain, and the second resource is the same as a symbol occupied by the adjusted second CORESET in time domain; or number other REGs other than a first resource in the adjusted second CORESET, where the first resource is a REG occupied by the first signaling.

Optionally, processing module is specifically configured to adjust, starting from a next slot of a first slot, a quantity of symbols of the second CORESET to the quantity of symbols indicated by the first signaling, where the first slot is a slot in which the first signaling is received.

For another example, the communication apparatus has a function of implementing the method provided in the fourth aspect. The processing module is configured to send, in a first CORESET or a second CORESET, first signaling to a terminal device through the communication module, where the first signaling indicates to monitor one of the second CORESET and the third CORESET, the second CORESET overlaps the first CORESET, and the third CORESET does not overlap the first CORESET.

Optionally, when renumbering the REG bundle that does not overlap the first CORESET and that is in the second CORESET, the processing module is specifically configured to renumber the REG bundle that does not overlap the first CORESET and that is in the second CORESET, including: renumbering, based on the quantity R of interleaving rows and the length L of the REG bundle, the REG bundle that does not overlap the first CORESET and that is in the second CORESET, where $$\frac{N_{REG}^{CORESET}}{L \times R}$$

is an integer, $$N_{REG}^{CORESET}$$

is a total quantity of REGs of the REG bundle that does not overlap the first CORESET and that is in the second CORESET, the at least two interleaving row values are configured for the second CORESET, and/or the at least two REG bundle length values are configured for the second CORESET.

Optionally, in a possible design, when renumbering the REG bundle that does not overlap the first CORESET and that is in the second CORESET, the processing module is specifically configured to: renumber the REG bundle that does not overlap the first CORESET and that is in the second CORESET, and skip n REG bundles during the renumbering, where $$\frac{N_{REG}^{CORESET'}}{L \times R}$$

is an integer, $$N_{REG}^{CORESET'}$$

is a quantity of remaining REGs other than the n REG bundles in the first REG bundle, and the first REG bundle is the REG bundle that does not overlap the first CORESET and that is in the second CORESET.

For another example, the communication apparatus has a function of implementing the method provided in the sixth aspect. The processing module is configured to send, in a first CORESET or a second CORESET, first signaling to a terminal device through the communication module, where the first signaling indicates to monitor one of the second CORESET and the third CORESET, the second CORESET overlaps the first CORESET, and the third CORESET does not overlap the first CORESET.

According to a ninth aspect, a communication apparatus is provided. The communication apparatus includes a processor and an interface circuit. The interface circuit is configured to receive a signal from another communication apparatus other than the communication apparatus and transmit the signal to the processor, or send a signal from the processor to another communication apparatus other than the communication apparatus. The processor is configured to implement the method in the first aspect, the third aspect, the fifth aspect, and any possible design by using a logic circuit or executing code instructions.

According to a tenth aspect, a communication apparatus is provided. The communication apparatus includes a processor and an interface circuit. The interface circuit is configured to receive a signal from another communication apparatus other than the communication apparatus and transmit the signal to the processor, or send a signal from the processor to another communication apparatus other than the communication apparatus. The processor is configured to implement the method in the second aspect, the fourth aspect, the sixth aspect, and any possible design by using a logic circuit or executing code instructions.

According to an eleventh aspect, a computer-readable storage medium is provided. The computer-readable storage medium stores a computer program or instructions. When the computer program or the instructions are executed by a processor, the method in any one of the first aspect to the sixth aspect and any possible design is implemented.

According to a twelfth aspect, a computer program product storing instructions is provided. When the instructions are run by a processor, the method in any one of the first aspect to the sixth aspect and any possible design is implemented.

According to a thirteenth aspect, a communication apparatus is provided. The communication apparatus includes a processor, and may further include a memory, configured to implement the method in any one of the first aspect to the sixth aspect and any possible design. The communication apparatus may be a chip system. The chip system may include a chip, or may include the chip and another discrete component.

According to a fourteenth aspect, a communication system is provided. The system includes the apparatus (for example, the terminal device) according to the first aspect and the apparatus (for example, the network device) according to the second aspect.

According to a fifteenth aspect, a communication system is provided. The system includes the apparatus (for example, the terminal device) according to the third aspect and the apparatus (for example, the network device) according to the fourth aspect.

According to a sixteenth aspect, a communication system is provided. The system includes the apparatus (for example, the terminal device) according to the fifth aspect and the apparatus (for example, the network device) according to the sixth aspect.

DETAILED DESCRIPTION OF ILLUSTRATIVE EMBODIMENTS

For ease of understanding embodiments of this application, the following first briefly describes several terms in this application.

1. CORESET: When receiving a PDCCH, a terminal device needs to know a location of the PDCCH in frequency domain and a location of the PDCCH in time domain. Currently, information such as a frequency band occupied by the PDCCH in frequency domain and a quantity of OFDM symbols occupied by the PDCCH in time domain may be encapsulated in the CORESET; information such as a start OFDM symbol number of the PDCCH and a monitoring periodicity of the PDCCH is encapsulated in a search space. Each search space is associated with one CORESET. A configuration of a PDCCH can be determined based on one CORESET and one search space.

The CORESET usually occupies {1, 2, or 3} symbols in time domain, and a start location may be any location in a slot. The CORESET is an integer multiple of six resource blocks (RBs) in frequency domain.

Figure 1:
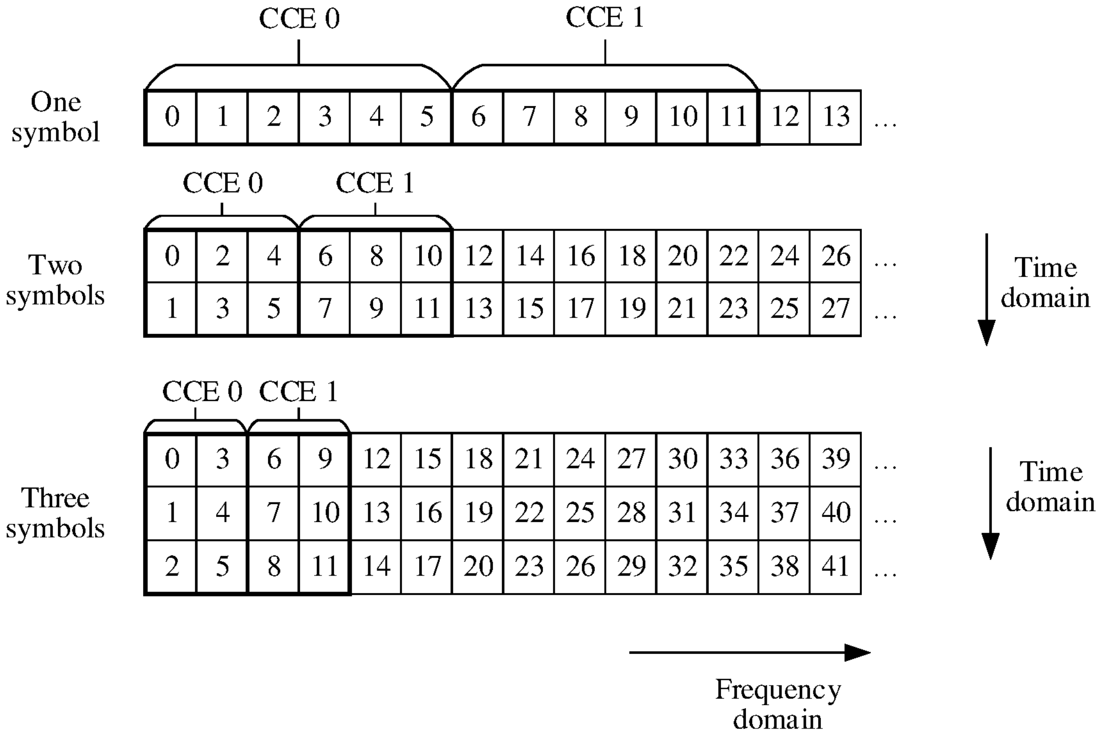
FIG. 1 is a schematic diagram of a CCE according to an embodiment of this application.

2. Resource element group (REG): One REG includes one RB in frequency domain and one OFDM symbol in time domain. Numbers of REGs in one CORESET increase in a time domain priority order, and an RB with the first OFDM symbol and the lowest frequency domain resource is a REG 0, as shown in FIG. 1.

3. Control channel element (CCE): One CCE is corresponding to six REGs. Both a resource that may be occupied by a PDCCH and a resource actually occupied by the PDCCH may be described by using a CCE.

Figure 2:
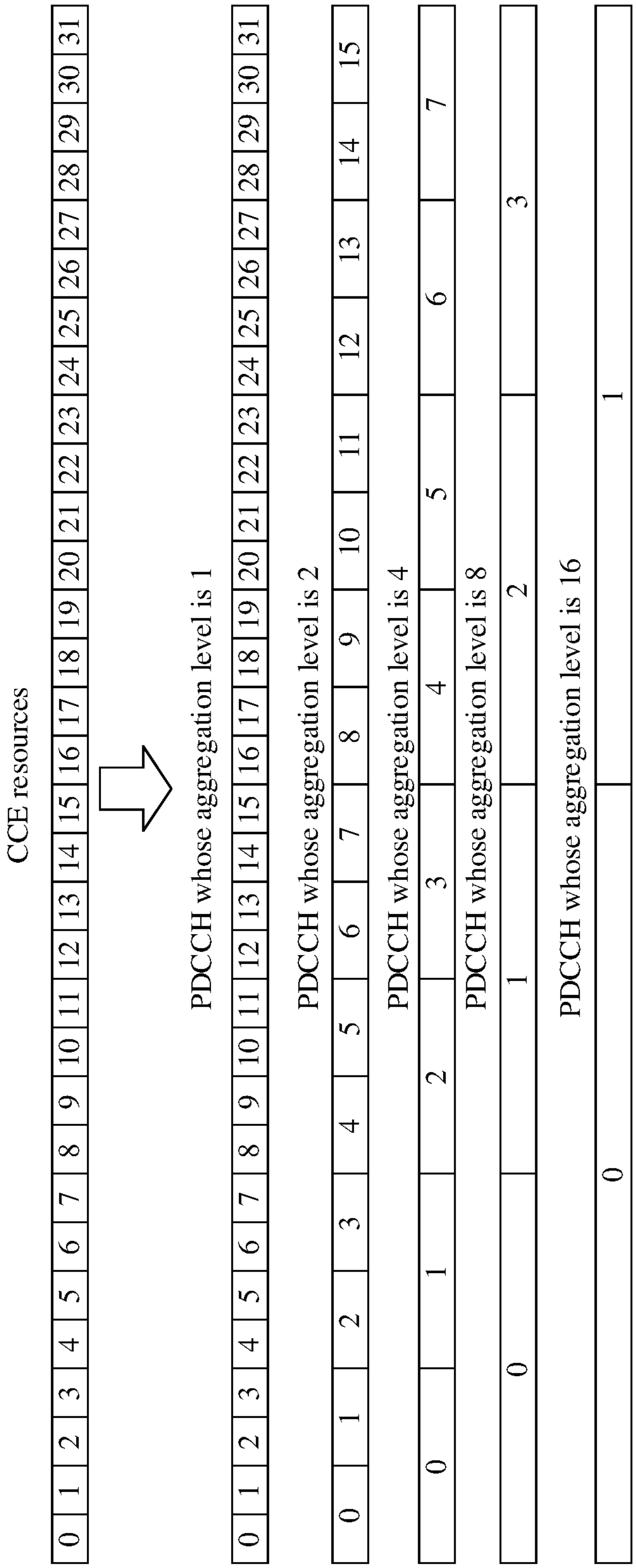
FIG. 2 is a schematic diagram of an aggregation level according to an embodiment of this application.

4. Aggregation level: A quantity of CCEs used by a PDCCH may be referred to as the aggregation level. For example, as defined in an NR system, the PDCCH may use {1, 2, 4, 8, or 16} CCEs. The quantity of used CCEs is also referred to as the aggregation level. A search space provides a candidate aggregation level of a PDCCH that needs to be monitored by a terminal device, and a quantity of candidate PDCCHs corresponding to the aggregation level. As shown in FIG. 2, a CORESET including 32 CCEs may define a search space whose CCE aggregation level is 1, a search space whose CCE aggregation level is 2, a search space whose CCE aggregation level is 4, a search space whose CCE aggregation level is 8, and a search space whose CCE aggregation level is 16.

5. REG bundle: One REG bundle includes L REGs, and CCE-to-REG mapping may be implemented by using one or more REG bundles. The CCE-to-REG mapping supports interleaving and non-interleaving manners. The mapping rules are as follows:

(1) A REG bundle numbered i includes REGs numbered $$\{iL, iL+1, \ldots, iL+L-1\} \cdot i = 0, 1, \ldots, N_{REG}^{CORESET}/L-1, \text{ and } N_{REG}^{CORESET}$$

is a quantity of REGs in a CORESET.

(2) A CCE numbered j includes a REG bundle numbered $$\left\{f\left(\frac{6j}{L}\right), f\left(\frac{6j}{L}+1\right), \ldots, f\left(\frac{6j}{L}+\frac{6}{L}-1\right)\right\} \cdot f(\cdot)$$

is an interleaver.

For non-interleaved CCE to REG mapping, L=6, and f(x)=x.

For interleaved CCE-to-REG mapping, if a quantity $$N_{symb}^{CORESET}$$

of symbols of the CORESET is 1, L∈{2,6}. If the quantity $$N_{symb}^{CORESET}$$

of symbols of the CORESET is $$L \in \{N_{symb}^{CORESET}, 6\}.$$

The interleaver is defined by using the following formula:

$$f(x) = (rC + c + n_{shift}) \bmod (N_{REG}^{CORESET}/L);$$
$$x = cR + r;$$
$$r = 0, 1, \ldots, R-1;$$
$$c = 0, 1, \ldots, C-1; \text{ and}$$
$$C = N_{REG}^{CORESET}/(LR).$$

$R \in \{2,3,6\}$, and $n_{shift}$ is a parameter configured by a higher layer or a cell number.

6. Terminal device: The terminal device includes a device that provides a voice and/or data connectivity for a user. Specifically, the terminal device includes a device that provides a voice for the user, includes a device that provides data connectivity for the user, or includes a device that provides the voice and data connectivity for the user. For example, a handheld device with a wireless connection function or a processing device connected to a wireless modem may be included. The terminal device may communicate with a core network through a radio access network (RAN), and exchange a voice or data with the RAN, or exchange a voice and data with the RAN. The terminal device may include user equipment (UE), a wireless terminal device, a mobile terminal device, a device-to-device (D2D) communication terminal device, a vehicle-to-everything (V2X) terminal device, a machine-to-machine/machine-type communication (M2M/MTC) terminal device, an internet of things (IOT) terminal device, a subscriber unit, a subscriber station, a mobile station, a remote station, an access point (AP), a remote terminal, an access terminal, a user terminal, a user agent, a user device, or the like. For example, the terminal device may include a mobile phone (or referred to as a "cellular" phone), a computer having a mobile terminal device, or a portable, pocket-sized, handheld, or a computer-embedded mobile apparatus. For example, it may be a device, for example, a personal communication service (PCS) phone, a cordless telephone set, a session initiation protocol (SIP) phone, a wireless local loop (WLL) station, or a personal digital assistant (PDA). The terminal device may alternatively include a limited device, for example, a device with low power consumption, a device with a limited storage capability, or a device with a limited computing capability. For example, the terminal device includes an information sensing device, for example, a barcode, radio frequency identification (RFID), a sensor, a global positioning system (GPS), or a laser scanner.

As an example instead of a limitation, in embodiments of this application, the terminal device may alternatively be a wearable device. The wearable device may also be referred to as a wearable intelligent device, an intelligent wearable device, or the like, and is a general term of wearable devices that are intelligently designed and developed for daily wear by using a wearable technology, such as glasses, gloves, watches, clothes, and shoes. The wearable device is a portable device that can be directly worn on the body or integrated into clothes or an accessory of a user. The wearable device is not only a hardware device, but also implements a powerful function through software support, data exchange, and cloud interaction. In a broad sense, a wearable intelligent device includes a full-featured and large-sized device that can implement all or a part of functions without depending on a smartphone, for example, a smart watch or a smart glass, and includes a device that focuses only on a type of application function and needs to collaboratively work with another device, for example, a smartphone, for example, various smart bands, smart helmets, or smart jewelry for monitoring physical signs.

In embodiments of this application, the terminal device may further include a relay. Alternatively, it may be understood that any device that can perform data communication with a base station may be considered as the terminal device.

In embodiments of this application, an apparatus configured to implement a function of the terminal device may be the terminal device, or may be an apparatus that is used in the terminal device and that can support the terminal device in implementing the function, for example, a component or a component having a communication function, or a chip system. The apparatus may be installed in the terminal device. In this embodiment of this application, the chip system may include a chip, or may include a chip and another discrete component. In the technical solutions provided in embodiments of this application, an example in which an apparatus configured to implement a function of a terminal is a terminal device is used to describe the technical solutions provided in embodiments of this application.

7. Network device: The network device, for example, includes an access network (AN) device, for example, a base station (for example, an access point), and may be a device that communicates with a terminal device over an air interface in an access network by using one or more cells. The network device may include an evolved NodeB (NodeB, eNB, or e-NodeB) in a long term evolution (LTE) system or a long term evolution-advanced (LTE-A) system, may include a next generation NodeB (gNB) in a 5th generation (5G) mobile communication technology NR system (also briefly referred to as an NR system), or may include a central unit (CU) and/or a distributed unit (DU) in a cloud radio access network (Cloud RAN) system. This is not limited in embodiments of this application. For example, the network device may be the CU in a Cloud RAN system, the DU, or entirety of the CU and the DU.

The network device may further include a core network device, and the core network device includes, for example, an access and mobility management function (AMF). Because embodiments of this application mainly relate to an access network, the network device is an access network device in the following descriptions unless otherwise specified.

In embodiments of this application, an apparatus configured to implement a function of the network device may be a network device, or may be an apparatus, for example, a chip system, that can support the network device in implementing the function. The apparatus may be installed in the network device. In the technical solutions provided in embodiments of this application, an example in which the apparatus configured to implement the function of the network device is the network device is used to describe the technical solutions provided in embodiments of this application.

In embodiments of this application, "at least one" means one or more, and "a plurality of" means two or more. The term "and/or" describes an association relationship between associated objects, and represents that three relationships may exist. For example, A and/or B may represent the following cases: Only A exists, both A and B exist, and only B exists, where A and B may be singular or plural. The character "/" generally indicates an "or" relationship between the associated objects. At least one of the following items (pieces) or a similar expression thereof refers to any combination of these items, including any combination of singular items (pieces) or plural items (pieces). For example, at least one of a, b, or c may represent: a, b, c, a and b, a and c, b and c, or a, b, and c, where a, b, and c may be single or plural.

Unless otherwise stated on the contrary, ordinal terms such as "first" and "second" mentioned in embodiments of this application are used to distinguish between a plurality of objects, and are not intended to limit sizes, content, a sequence, a time sequence, priorities, importance degrees, or the like of the plurality of objects. For example, a first time domain resource and a second time domain resource are merely for distinguishing between different time domain resources, but do not indicate different sizes, locations, priorities, importance degrees, or the like of the two time domain resources.

The foregoing describes some noun concepts used in embodiments of this application. The following describes technical features of embodiments of this application.

Currently, NR configures a CORESET for the terminal device through RRC, to notify the terminal device of a time-frequency resource occupied by a detected PDCCH. When the NR configures the CORESET through the RRC, each terminal device is separately notified of the CORESET. The network device consumes long time to indicate, through the RRC, a plurality of terminal devices to modify time-frequency resources occupied by the CORESETs. As a result, a service change requirement cannot be tracked in real time, and user experience is affected.

Figure 3:
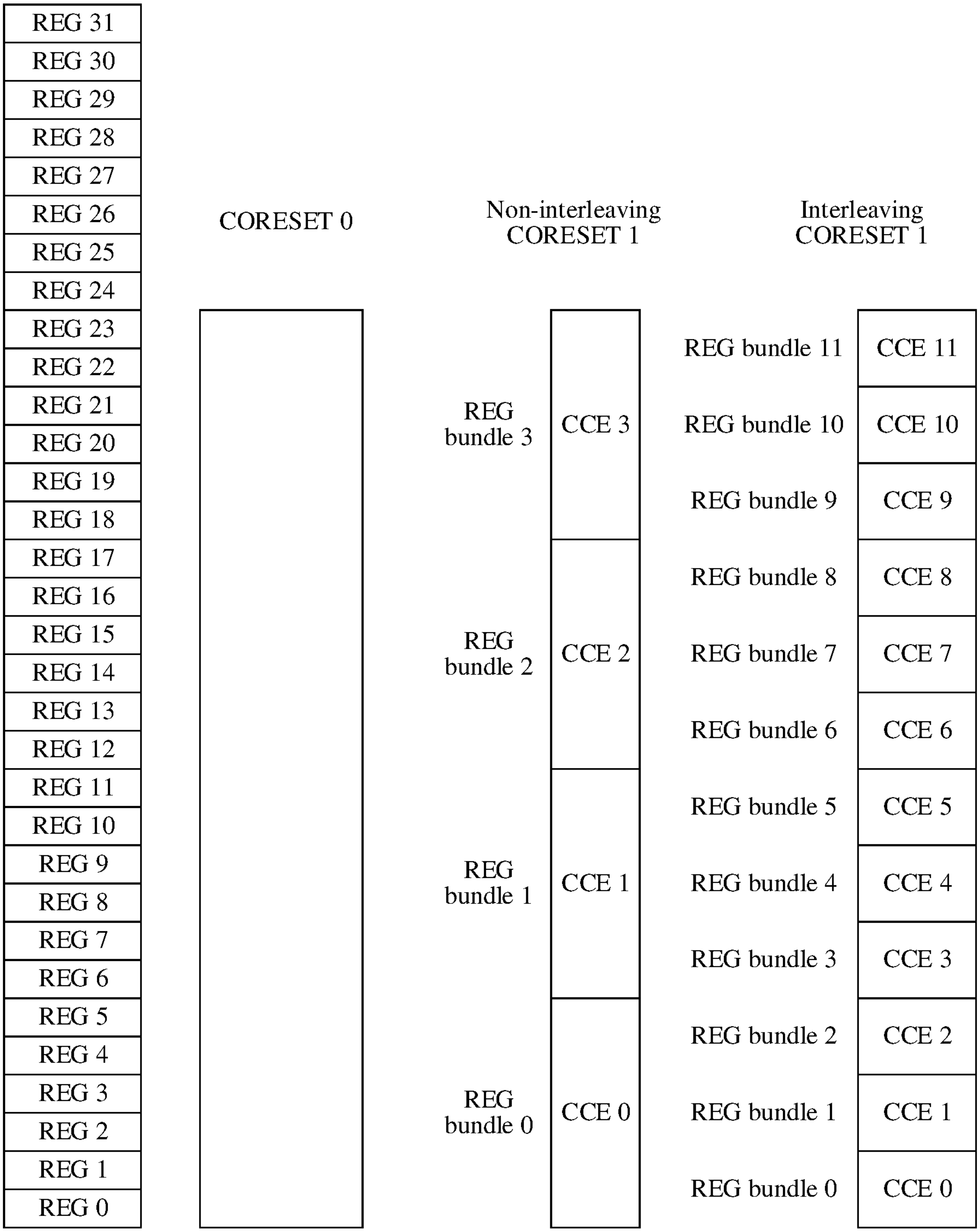
FIG. 3 is a schematic diagram in which a CORESET 0 overlaps a CORESET 1 according to an embodiment of this application.

In addition, if a CORESET 0 overlaps, in resources, another CORESET (assumed as a CORESET 1) that is configured after the terminal device performs random access, CCEs at which the CORESET 1 conflicts with the CORESET 0 when the CORESET 1 uses an interleaving manner are more than CCEs at which the CORESET 1 conflicts with the CORESET 0 when the CORESET 1 uses a non-interleaving manner. It is assumed that a system bandwidth is 100 MHz and includes 273 RBs, the CORESET 1 is one symbol, 270 REGs, and 45 CCEs, the REG bundle size L=2, the interleaving depth R=3, and the CORESET 0 occupies 24 RBs. CCEs at which a non-interleaved CORESET 1 and an interleaved CORESET 1 separately conflict with the CORESET 0 are shown in FIG. 3. It can be learned that the non-interleaved CORESET 1 conflicts with the CORESET 0 at four CCEs, and the interleaved CORESET 1 conflicts with the CORESET 0 at 12 CCEs. FIG. 3 shows only CCEs in a conflict area between the CORESET 1 and the CORESET 0, and does not show CCEs in other parts. Therefore, there are a few available resources when a resource conflict occurs between the interleaved CORESET and the CORESET 0.

Based on this, embodiments of this application provide two communication methods and apparatuses, to resolve a problem that the network device consumes excessively long time to indicate the terminal device to modify a time-frequency resource occupied by a CORESET, and a problem that there are few available resources when a resource conflict occurs between the interleaved CORESET and the CORESET 0. The method and the apparatus are based on a same inventive concept. Because the method and the apparatus have a similar problem-resolving principle, for implementations of the apparatus and the method, refer to each other. No repeated description is provided.

The technical solutions in embodiments of this application may be applied to various communication systems, such as internet of things (IOT), narrow band internet of things (NB-IoT), LTE, a $5^{th}$ generation (5G) communication system, an LTE and 5G hybrid architecture, or a new communication system emerging in 6G or future communication development. The 5G communication system in this application may include at least one of a non-standalone (NSA) 5G communication system and a standalone (SA) 5G communication system. The communication system may alternatively be an M2M network, an MTC, or another network.

Figure 4:
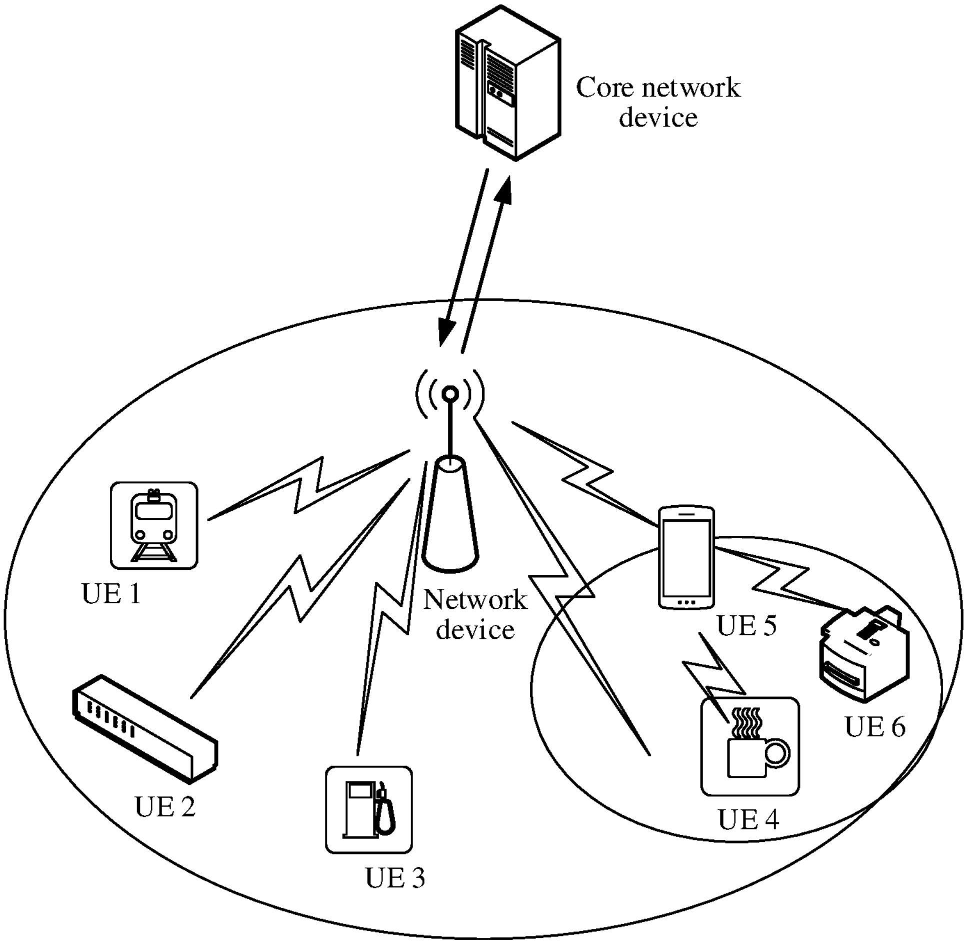
FIG. 4 is a schematic diagram of an architecture of a network system according to an embodiment of this application.

As shown in FIG. 4, the communication methods provided in embodiments of this application may be applied to a communication system. The communication system includes a network device and six terminal devices, namely, UE 1 to UE 6. In the communication system, the UE 1 to the UE 6 may send uplink information to the network device, and the network device may receive uplink data sent by the UE 1 to the UE 6. In addition, the UE 4 to the UE 6 may also form a communication subsystem. The network device may send downlink information to the UE 1, the UE 2, the UE 3, and the UE 5. The UE 5 may send the downlink information to the UE 4 and the UE 6 based on a device-to-device (D2D) technology, or the UE 4 to the UE 6 may communicate with each other based on the D2D technology.

Embodiments of this application may also be applied to another communication system provided that cross-slot uplink transmission needs to be performed in the communication system. In addition, embodiments of this application are not only applicable to a scenario in which one network device communicates with one UE, but also applicable to a scenario in which one network device communicates with a plurality of UEs, or a plurality of network devices communicate with one or more UEs in a coordinated manner. FIG. 4 is merely a schematic diagram, and a type of a communication system, a quantity of devices included in the communication system, a type of a device included in the communication system, and the like are not specifically limited.

A network architecture and a service scenario described in embodiments of this application are intended to describe the technical solutions in embodiments of this application more clearly, and do not constitute any limitation on the technical solutions provided in embodiments of this application. A person of ordinary skill in the art may know that, with evolution of a network architecture and emergence of a new service scenario, the technical solutions provided in embodiments of this application are also applicable to a similar technical problem.

In this embodiment of this application, "when . . . " may also be described as "if . . . ", "if", "when . . . ", or the like. For example, "in a case in which a quantity of symbols of a second CORESET is 1" may also be described as "assuming that a quantity of symbols of a second CORESET is 1", "if a quantity of symbols of a second CORESET is 1", or "when a quantity of symbols of a second CORESET is 1".

The following describes the technical solutions in embodiments of this application with reference to the accompanying drawings in embodiments of this application. It should be understood that processing performed by a single execution body (the terminal device or the network device) shown in this embodiment of this application may also be divided and performed by a plurality of execution bodies, and the execution bodies may be logically and/or physically separated. For example, when the network device is entirety of a CU and a DU, processing performed by the network device may be divided and performed by the CU and the DU.

This application provides two communication methods for a problem that the network device consumes excessively long time to indicate the terminal device to change a quantity of symbols occupied by a PDCCH. The method may be performed by a communication device (for example, the terminal device or the network device), or may be performed by a chip or a circuit.

Figure 5:
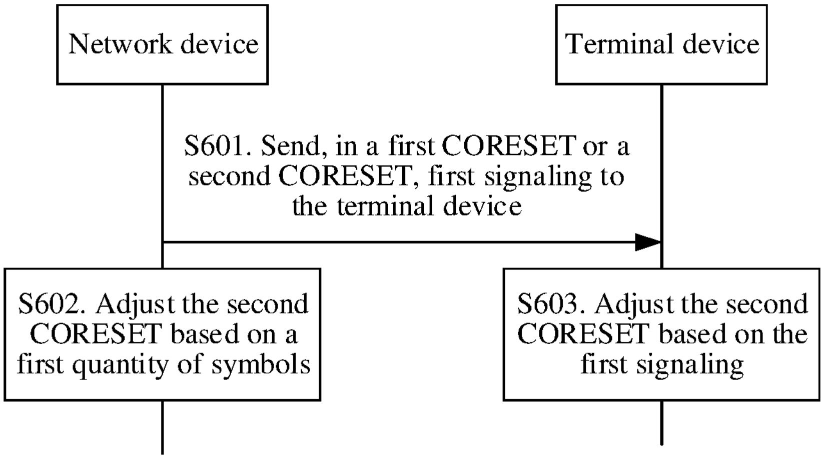
FIG. 5 is a schematic flowchart of a communication method according to an embodiment of this application.

Embodiment 1: As shown in FIG. 5, the method includes the following steps.

S601. A network device sends, in a first CORESET or a second CORESET, first signaling to a terminal device. Correspondingly, the terminal device receives, in the first CORESET or the second CORESET, the first signaling from the network device.

The first signaling indicates a resource occupied by the second CORESET. For example, the first signaling may indicate a time domain resource of the second CORESET, the first signaling may indicate a frequency domain resource of the second CORESET, or the first signaling may indicate a time-frequency resource of the second CORESET.

An implementation in which the first signaling indicates the frequency domain resource of the second CORESET may be as follows: The first signaling may indicate a first quantity of symbols of the second CORESET. In an implementation, an adjustable quantity of candidate symbols of the second CORESET may include 1 and/or 2. In this manner, the first signaling may be indicated by using one bit, so that overheads can be reduced. Certainly, the adjustable quantity of candidate symbols of the second CORESET may also include another quantity. This is not specifically limited herein.

The implementation in which the first signaling indicates the frequency domain resource of the second CORESET may be as follows: The second CORESET is corresponding to at least two frequency domain resources, and the network device may indicate, by using the first signaling, a frequency domain resource used by the second CORESET.

An implementation in which the first signaling indicates the time-frequency resource of the second CORESET may be as follows: The second CORESET is corresponding to at least two time-frequency resource configurations. Any two of the at least two time-frequency resource configurations have different quantities of symbols and/or different frequency domain resources. The network device may indicate, by using the first signaling, a time-frequency resource configuration used by the second CORESET.

Figure 6:
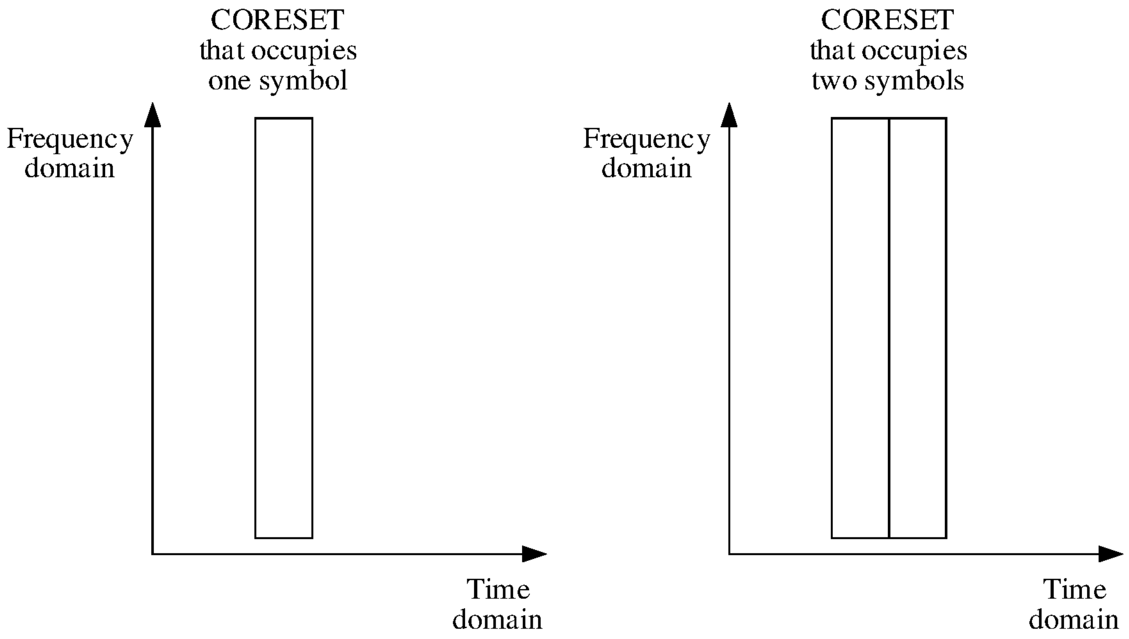
FIG. 6 is a schematic diagram of adjusting a quantity of symbols of a CORESET according to an embodiment of this application.

In the foregoing manner, the first signaling is used to adjust the resource occupied by the second CORESET. This facilitates PDCCH transmission, improves communication reliability, or helps improve resource utilization. For example, when the terminal device needs a large quantity of scheduling resources, the first signaling may indicate the second CORESET to occupy more symbols, and/or indicate the second CORESET to occupy more frequency domain resources. This facilitates the PDCCH transmission and improves the communication reliability. When the terminal device needs a few scheduling resources, the first signaling may indicate the second CORESET to occupy fewer symbols, and/or indicate the second CORESET to occupy fewer frequency domain resources. Remaining time-frequency resources may be allocated to other transmission, for example, a physical downlink shared channel (PDSCH). This helps improve the resource utilization and can further improve user experience. FIG. 6 is schematic diagrams in which a CORESET occupies one symbol and a CORESET occupies two symbols.

In addition, the first signaling indicates the quantity of symbols of the second CORESET, so that impact on frequency domain diversity can be reduced.

The first signaling indicates the frequency domain resource of the second CORESET, so that a smaller adjustment granularity can be implemented.

In a possible implementation, the first signaling may further indicate a modulation scheme of a PDCCH. For example, when channel quality is good or there is a large quantity of scheduling times, the first signaling may indicate that the modulation scheme of the PDCCH is 16 quadrature amplitude modulation (QAM). For example, when channel quality is poor or there is a small quantity of scheduling times, the first signaling may indicate that the modulation scheme of the PDCCH is quadrature phase shift keying (QPSK) modulation. In the foregoing manner, a PDCCH capacity can be further increased, so that system performance and user experience can be improved.

In an implementation in which the first signaling is sent in the first CORESET, a monitoring periodicity of the first signaling may be a PDCCH monitoring periodicity or a synchronization signal/physical broadcast channel block (SSB) periodicity indicated by a first search space. The first search space is for monitoring a PDCCH for scheduling a system information block 1 (SIB1). For example, the first search space is a search space 0, and the first CORESET and the SSB are in a same beam direction, or a quasi-colocation (QCL) relationship between the first CORESET and the SSB may be at least type-D. Optionally, in the foregoing implementation, the first signaling may indicate a resource occupied by the second CORESET in one slot, or may indicate resources occupied by the second CORESET in a plurality of slots. For example, the first signaling may indicate resources of the second CORESET in each slot in a half-frame or one frame, and resources of the second CORESET in different slots may be the same or may be different. In an implementation, resources of the second CORESET in each slot group may be indicated by using a slot group manner. In other words, a plurality of slots are grouped. Resources in slots in the slot group are the same, and resources in different slot groups may be the same or may be different. In another implementation, resources of the second CORESET in each slot group may be indicated by using a single slot manner. In other words, each slot has a corresponding resource indication, and the resources in different slots may be the same or may be different. Specifically, the resources occupied by the second CORESET in the plurality of slots may be indicated by using a bitmap manner.

Alternatively, a second search space may be configured, and the monitoring periodicity of the first signaling may be indicated by the second search space. A periodicity indicated by the second search space is different from a periodicity indicated by the first search space.

In a specific example, a network device may send a plurality of pieces of first signaling in a plurality of directions. For example, the network device may send the first signaling by using a plurality of beams. Optionally, the plurality of directions may be within a range of the beam direction of the SSB.

In the foregoing example, the network device may send one beam at a time, or may send a plurality of beams at the same time. This is not specifically limited herein.

The first signaling may be UE-level signaling, UE group (group-level) signaling, or cell-level signaling. In a possible implementation, the first signaling is the cell-level signaling, and the network device may send a plurality of pieces of first signaling on a plurality of beams at different moments. Content of the plurality of pieces of first signaling is the same. In another possible implementation, the first signaling is the UE group-level signaling or the UE-level signaling. The network device may send a plurality of pieces of first signaling on a plurality of beams at different moments. Content of the plurality of pieces of first signaling may be the same or different.

Figure 7:
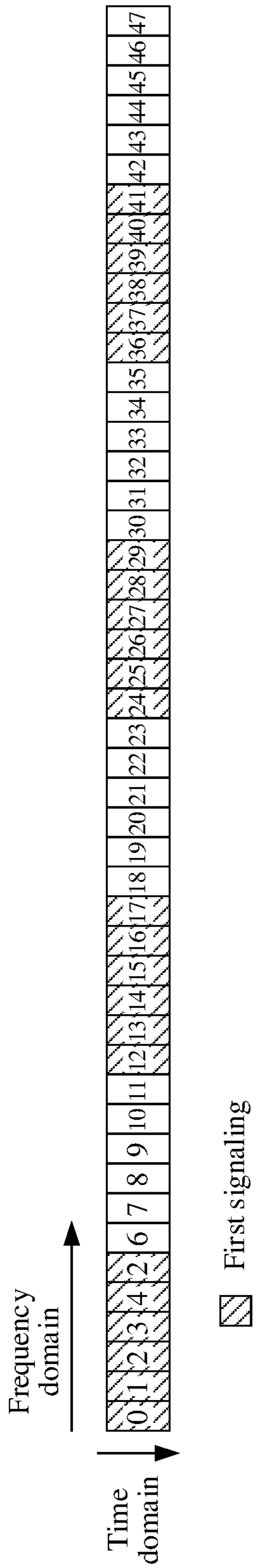
FIG. 7 is a schematic diagram of mapping first signaling according to an embodiment of this application.

For example, a mapping manner of the first signaling in the first CORESET may be a PDCCH mapping manner in NR. Alternatively, the mapping manner of the first signaling in the first CORESET may be the same as a mapping manner of the first signaling in the second CORESET. For example, the mapping manner of the first signaling may be: The first signaling includes N pieces of sub information, each piece of sub information occupies M RBs in the second CORESET, and a minimum identifier of an RB occupied by each piece of sub information is an integer multiple of p. N is an integer greater than 0. For example, N may be 2, 4, or 8. M is an integer multiple of p, and p is an integer greater than 1. For example, p may be 2, 3, or 6. As shown in FIG. 7, for example, N is 4, p is 6, and M is 6. The first signaling may be mapped to RBs whose identifiers are 0 to 5, 12 to 17, 24 to 29, and 36 to 41. This mapping manner can facilitate remapping of a REG bundle in a remaining resource area in the second CORESET.

In the foregoing example, a quantity of symbols of the first signaling may be different from a quantity of symbols of the second CORESET. In this design, flexibility of the first signaling can be improved. Certainly, the quantity of symbols of the first signaling may alternatively be the same as the quantity of symbols of the second CORESET. This is not specifically limited herein.

In this embodiment of this application, the first CORESET may be a common CORESET, and the second CORESET may be a terminal device-specific CORESET. Alternatively, an identifier of the first CORESET is 0, in other words, the first CORESET is a CORESET 0, and an identifier of the second CORESET is greater than 0, in other words, the second CORESET may be a CORESET 1, a CORESET 2, a CORESET 3, or the like. Alternatively, the second CORESET may be a CORESET configured by using terminal device-specific signaling, and the first CORESET is a CORESET configured by using a physical broadcast channel (PBCH) or system information. Alternatively, the first CORESET may be for monitoring a physical downlink control channel in an idle state, and the second CORESET is for monitoring the physical downlink control channel in a non-idle state. Alternatively, the first CORESET may be configured before an initial accesses of the terminal device, and the second CORESET may be configured after the initial accesses of the terminal device. Alternatively, the first CORESET may be a CORESET whose size of a time-frequency resource cannot be indicated by using the first signaling to change quickly, and the second CORESET may be a CORESET whose size of a time-frequency resource may be indicated by using the first signaling to change quickly. Alternatively, at least one of the first CORESET and the second CORESET is indicated by the network device by using signaling.

Optionally, the network device may indicate resources of second CORESETs of a plurality of cells of the terminal device by using first signaling. For example, the network device may send the first signaling in a primary cell (PCell) and/or a special cell (SpCell). Correspondingly, the terminal device may detect the first signaling in the PCell and/or the SpCell. In this manner, another cell of the terminal device does not need to allocate a resource to monitor the first signaling, and impact on the another cell is small.

S602. The network device adjusts the second CORESET based on the first quantity of symbols.

It should be noted that there is no strict sequence for performing steps S601 and S602. This is not specifically limited herein.

A manner in which the network device adjusts the second CORESET is similar to a manner in which the terminal device adjusts the second CORESET. A specific adjustment manner is described in detail below.

S603. The terminal device adjusts the second CORESET based on the first signaling.

In an implementation, if the first signaling indicates that the quantity of symbols of the second CORESET is the first quantity of symbols, the quantity of symbols of the second CORESET may be adjusted to the first quantity of symbols. If the first signaling indicates the frequency domain resource of the second CORESET, the frequency domain resource of the second CORESET may be adjusted to a frequency domain resource indicated by the first signaling, for example, adjusted to a frequency domain resource size and/or a frequency domain location indicated by the first signaling. If the first signaling indicates the time-frequency resource of the second CORESET, the time-frequency resource of the second CORESET may be adjusted to a time-frequency resource indicated by the first signaling, for example, may be adjusted to a time domain size indicated by the first signaling in time domain, and may be adjusted to a frequency domain resource size and/or a frequency domain location indicated by the first signaling in frequency domain.

In an implementation in which the first signaling is sent in the second CORESET, the second CORESET may be adjusted starting from a first slot, and the first slot is a slot in which the first signaling is received. Alternatively, the second CORESET may be adjusted starting from a next slot (referred to as a second slot below) of the first slot or a next subframe (referred to as a first subframe below) of a subframe in which the first slot is located.

It should be noted that, in the manner of adjusting the second CORESET starting from the first slot, a slot for adjusting the second CORESET includes the first slot, and a resource of the second CORESET in a slot after the first slot is the same as an adjusted resource in the first slot until next signaling indicating the resource of the second CORESET is received.

In the manner of adjusting the second CORESET starting from the second slot, a slot for adjusting the second CORESET includes the second slot, and a resource of the second CORESET in a slot after second slot is the same as an adjusted resource in the second slot until next signaling indicating the resource of the second CORESET is received.

In the manner of adjusting the second CORESET starting from the first subframe, a slot for adjusting the second CORESET includes a first slot (which is referred to as a third slot below) of the first subframe, and a resource of the second CORESET in the third slot is the same as an adjusted resource in the third slot until next signaling indicating the resource of the second CORESET is received.

Optionally, after a resource size of the second CORESET is adjusted, a REG, a REG bundle, or a CCE of the second CORESET may be further renumbered. Specifically, if the slot for adjusting the second CORESET includes the first slot, the REG, the REG bundle, or the CCE of the second CORESET may be renumbered. A specific process is described in detail in the following.

It should be noted that, a process of adjusting the resource size of the second CORESET and a process of renumbering the resource may be performed separately. For example, the resource size of the second CORESET may be adjusted, and then the REG, the REG bundle, or the CCE of the second CORESET is renumbered. Alternatively, a process of adjusting the resource size of the second CORESET and a process of renumbering the resource may be performed simultaneously. For example, the REG, the REG bundles, or the CCE of the second CORESET is renumbered when the resource size of the second CORESET is adjusted.

In this embodiment of this application, signaling that indicates a resource of a CORESET is sent in the CORESET (for example, the first CORESET or the second CORESET). This helps implement flexible indication of a CORESET resource, so that a service requirement can be more quickly matched, and user experience can be improved. Specifically, the first signaling is detected in the first CORESET, so that complexity of mapping the first signaling can be reduced. The first signaling is monitored in the second CORESET, so that the network device can configure the first signaling more flexibly, and a cell-level or UE group-level resource may not be occupied, thereby facilitating sending of other cell-level or UE group-level signaling.

The following describes a process of renumbering the REG or the CCE of the second CORESET with reference to four cases of the adjusted second CORESET. It should be understood that, when the REG or the CCE of the second CORESET is renumbered below, a quantity of symbols occupied by the second CORESET is the quantity of symbols indicated by the first signaling, and a frequency domain resource occupied by the second CORESET is the frequency domain resource indicated by the first signaling.

Case 1: The first signaling occupies one symbol in time domain, and the first signaling indicates that the quantity of symbols of the second CORESET is 1, in other words, after the second CORESET is adjusted based on the first signaling, the quantity of symbols is 1.

In this case, the quantity of symbols occupied by the second CORESET before the second CORESET is adjusted based on the first signaling may be equal to 1 or may be greater than 1.

In this case, a process of renumbering the second CORESET may be: renumbering other REGs other than a first resource in the second CORESET, where the first resource is a REG occupied by the first signaling. In other words, the first resource may be skipped when the REG of the second CORESET is renumbered, in other words, the first resource does not participate in the renumbering.

Figure 8:
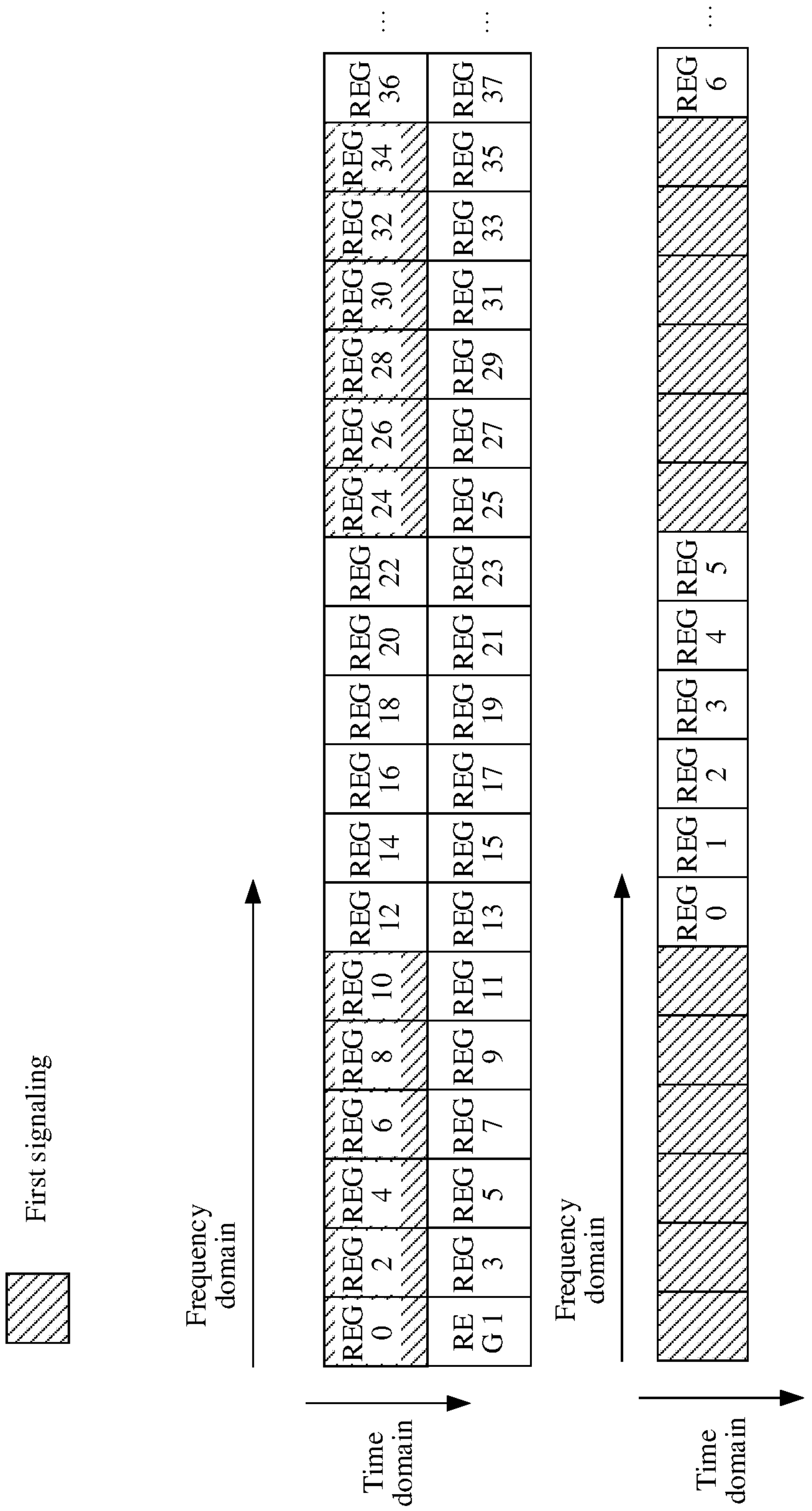
FIG. 8 is a schematic diagram of REG renumbering according to an embodiment of this application.

In an example for descriptions, with reference to the example shown in FIG. 7, an example in which the quantity of symbols occupied by the second CORESET before the second CORESET is adjusted based on the first signaling is 2 is used. A process of renumbering the second CORESET may be shown in FIG. 8.

Case 2: The first signaling occupies one symbol in time domain, and the first signaling indicates that the quantity of symbols occupied by the second CORESET is greater than 1, in other words, after the second CORESET is adjusted based on the first signaling, the quantity of symbols is greater than 1.

In this case, the quantity of symbols occupied by the second CORESET before the second CORESET is adjusted based on the first signaling may be equal to 1 or may be greater than 1.

In this case, the process of renumbering the second CORESET may be: numbering other REGs other than a second resource in the second CORESET, where the second resource is the same as a resource occupied by the first signaling in frequency domain, and the second resource is the same as a symbol occupied by the adjusted second CORESET in time domain.

Figure 9:
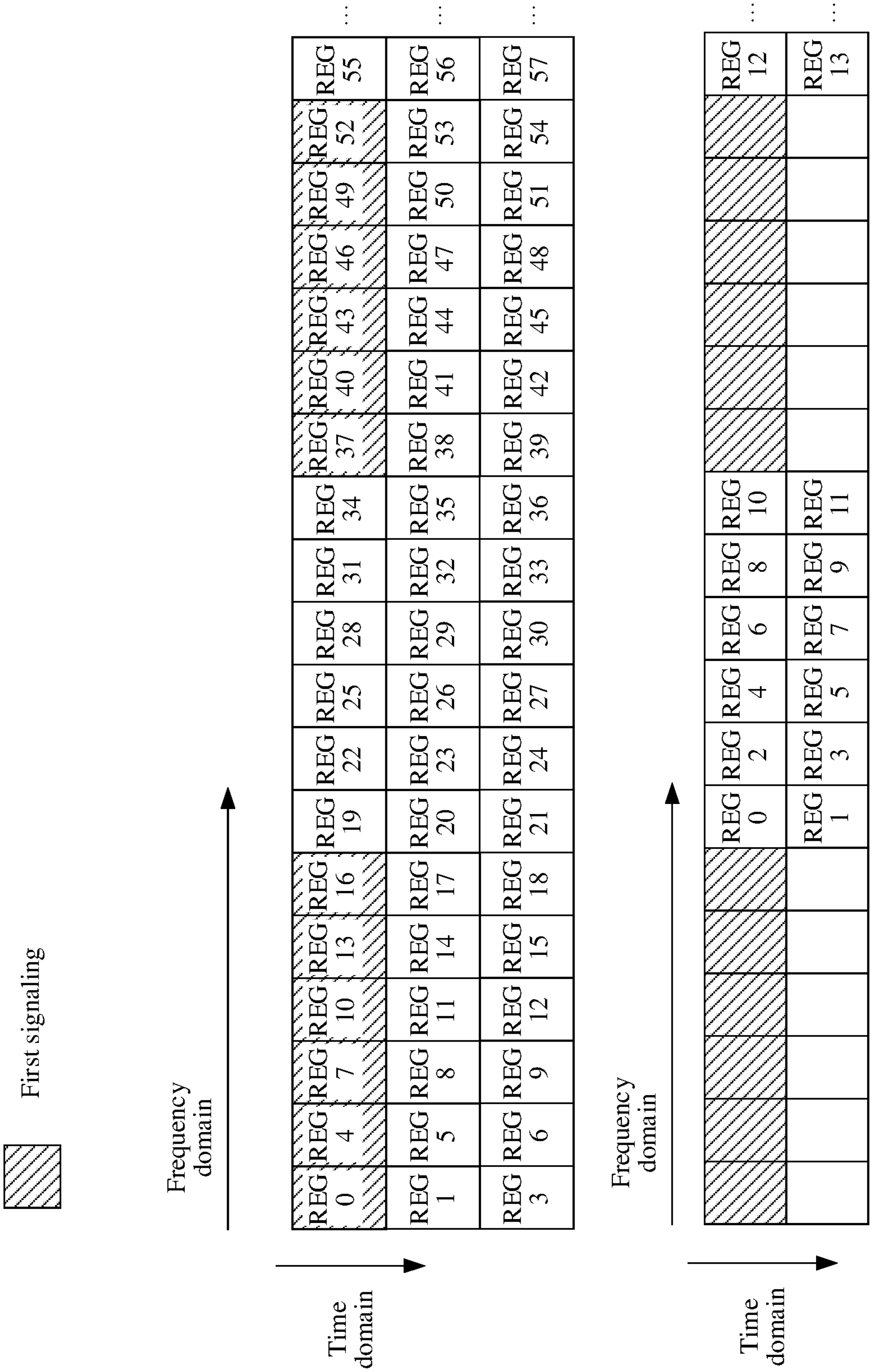
FIG. 9 is a schematic diagram of REG renumbering according to an embodiment of this application.

In an example for descriptions, with reference to the example shown in FIG. 7, an example in which the quantity of symbols occupied by the second CORESET before the second CORESET is adjusted based on the first signaling is 3, and the first signaling indicates two symbols is used. The process of renumbering the second CORESET may be shown in FIG. 9.

Alternatively, the REGs other than the first resource in the second CORESET are numbered, where the first resource is the REG occupied by the first signaling. In this manner, if there is a remainder m when a modulo operation is performed on remaining REGs other than the first resource in the second resource by the length of the REG bundle, REGs (that is, m REGs) corresponding to the remainder may be discarded. "Discarding the REGs corresponding to the remainder" may be understood as skipping this part of REGs when the other REGs other than the second resource in the second CORESET are numbered, or this part of REGs do not participate in the renumbering.

In this embodiment of this application, the length of the REG bundle may also be referred to as the size of the REG.

Case 3: A quantity of symbols occupied by the first signaling in time domain is the same as the quantity of symbols of the second CORESET, and the quantity of symbols indicated by the first signaling is less than the quantity of symbols occupied by the first signaling in time domain. In other words, the quantity of symbols of the second CORESET after the second CORESET is adjusted based on the first signaling is less than a quantity of symbols before the second CORESET is adjusted based on the first signaling, and/or a frequency domain resource of the second CORESET after the second CORESET is adjusted based on the first signaling is less than a frequency domain resource before the second CORESET is adjusted based on the first signaling.

In this case, the process of renumbering the second CORESET may be: renumbering other REGs, REG bundles, or CCEs other than a third resource in the second CORESET, where the third resource is a REG, a REG bundle, or a CCE occupied by the first signaling.

Optionally, when another signal (for example, a PDSCH) is sent at a resource location of the second CORESET before the second CORESET is adjusted, a resource occupied by the first signaling is avoided.

Case 4: The quantity of symbols occupied by the first signaling in time domain is the same as the quantity of symbols of the second CORESET, and the quantity of symbols indicated by the first signaling is greater than the quantity of symbols occupied by the first signaling in time domain. In other words, the quantity of symbols of the second CORESET after the second CORESET is adjusted based on the first signaling is greater than a quantity of symbols before the second CORESET is adjusted based on the first signaling.

In this case, for the process of renumbering the second CORESET, refer to the process of renumbering the second CORESET in the foregoing case 2. Details are not described herein again.

The foregoing describes a manner of a process of renumbering the terminal device and the network device. In the foregoing manner, a conflict between the first signaling and a PDCCH mapped to the second CORESET can be reduced.

In the foregoing manner, the quantity of symbols and/or the frequency domain resource of the second CORESET changes. A quantity of resources of the second CORESET changes as the quantity of symbols and/or the frequency domain resource of the second CORESET changes. Old parameters L and R may not be applicable, and it cannot be ensured that C is still an integer. Therefore, after interleaving, a part of REG bundles may not have sufficient REGs, or a part of REGs are not mapped to the REG bundle. For C, refer to the foregoing formula descriptions in the REG bundle in the term descriptions. For this problem, embodiments of this application provide three methods.

Method 1: A quantity R of interleaving rows of the second CORESET and/or the length L of the REG bundle may be adjusted. In this manner, it can be ensured that C is an integer, so that resource utilization can be improved.

For example, at least two interleaving row values and/or at least two REG bundle length values may be configured for the second CORESET. In this manner, the quantity R of interleaving rows of the second CORESET and/or the length L of the REG bundle of the second CORESET may be determined based on the first signaling.

The determined R and L may make C an integer, in other words, the determined R and L may meet:

$$\frac{N_{REG}^{CORESET}}{L\times R}$$

is an integer. If the first signaling is sent in the first CORESET, $$N_{REG}^{CORESET}$$

is a quantity of REGs obtained after the quantity of symbols of the second CORESET is adjusted. If the first signaling is sent in the second CORESET, $$N_{REG}^{CORESET}$$

may alternatively be a quantity of remaining REGs other than the first resource, the second resource, or the third resource after the quantity of symbols of the second CORESET is adjusted.

In a specific manner, there may be a correspondence between an interleaving row value and/or a REG bundle length value and a quantity of symbols. When the quantity R of interleaving rows of the second CORESET and/or the length L of the REG bundle of the second CORESET are/is determined based on the first signaling, a corresponding interleaving row value and/or a corresponding REG bundle length value may be determined based on the quantity of symbols indicated by the first signaling.

In another specific manner, the terminal device may select a group of R and L, and if the interleaving row value and the REG bundle length value do not meet that $$\frac{N_{REG}^{CORESET}}{L\times R}$$

is an integer, select a next group of R and L. If the group of R and L still does not meet:

$$\frac{N_{REG}^{CORESET}}{L\times R}$$

is an integer, a next group of R and L continues to be selected until R and L that meet that $$\frac{N_{REG}^{CORESET}}{L\times R}$$

is an integer are selected as a quantity of interleaving rows of the second CORESET and/or the length of the REG bundle. In this manner, the network device may configure the group of R and L as default values. When selecting R and L, the terminal device preferentially selects the default values.

Optionally, when a quantity of RBs of the second CORESET cannot be exactly divided by 12 and/or 18, at least two interleaving row values and/or at least two REG bundle length values may be configured for the second CORESET. Because the quantity of RBs of the second CORESET cannot be exactly divided by 12 or 18, there is no group of R and L that ensure C to always be an integer when the quantity of symbols of the second CORESET changes. For example, when the quantity of RBs of the second CORESET is 30 or 150, there is no group of R and L that ensure C to always be an integer when the quantity of symbols of the second CORESET changes. For another example, when the quantity of RBs of the second CORESET is 270, there is a group of R and L (L=6, R=3) that ensure C to always be an integer when the quantity of symbols of the second CORESET changes. For example, Table 1 shows possible values of L and R used when the quantity of RBs of the second CORESET is 270 and a symbol changes.

TABLE 1

| Quantity of RBs | 270 | | | | | | | | | | | |
|---|---|---|---|---|---|---|---|---|---|---|---|---|
| Quantity of symbols | 1 | | 2 | | | | | | 3 | | | |
| Quantity of REGs | 270 | | 540 | | | | | | 810 | | | |
| L | 2 | 6 | 2 | | | 6 | | | 3 | | | 6 |
| Quantity of REG bundles | 135 | 45 | 270 | | | 90 | | | 270 | | | 135 |
| R | 3 | 3 | 2 | 3 | 6 | 2 | 3 | 6 | 2 | 3 | 6 | 3 |
| C | 45 | 15 | 135 | 90 | 45 | 45 | 30 | 15 | 135 | 90 | 15 | 45 |

Method 2: If the quantity of symbols of the CORESET supported by the terminal device changes between 1, 2, and 3, L may be 6. The network device may configure L to be equal to 6, the terminal device may consider L to be equal to 6 by default, or a protocol may predefine L to be 6. In this implementation, one or more interleaving rows may be configured. This is not specifically limited herein.

Method 3: If L and R are configured, and C obtained through calculation is not an integer, a part of REG bundles may be discarded to ensure C to be an integer, and the REG bundles may be discarded in ascending order (or in descending order) of identifiers of the REG bundles. "Discarding a part of REG bundles" may be understood as skipping the part of REG bundles during numbering, the part of REG bundles do not participate in numbering, or the second CORESET does not include the part of REG bundles.

As mentioned above, the quantity of symbols of the second CORESET changes. Therefore, the quantity of resources of the second CORESET changes, and old parameters L and R may not be applicable. In addition, because the resource quantity of the second CORESET changes, an old quantity of candidate PDCCHs may also be inapplicable. For example, if the resource quantity of the second CORESET increases, and the old quantity of candidate PDCCHs is still used, a quantity of CCEs that need to be monitored by the terminal device may exceed a capability of the terminal device. Based on this, in this embodiment of this application, the quantity of candidate PDCCHs that correspond to an aggregation level and that are in a search space associated with the second CORESET may be adjusted, and the foregoing manner helps better allocate PDCCH resources.

In an implementation, a quantity of candidate PDCCHs corresponding to at least one aggregation level may be configured in a search space associated with the second CORESET. A first aggregation level in the at least one aggregation level is corresponding to a quantity of at least two candidate PDCCHs.

In another implementation, a maximum quantity of candidate PDCCHs corresponding to at least one aggregation level may alternatively be configured in a search space associated with the second CORESET. In this implementation, if the quantity of resources corresponding to the second CORESET can support the maximum quantity of candidate PDCCHs, the maximum quantity of candidate PDCCHs may be used. If not, a maximum value of a quantity of candidate PDCCHs supported by the resource corresponding to the second CORESET at a first aggregation level may be used. The first aggregation level is an aggregation level configured in the search space associated with the second CORESET.

It may be understood that the foregoing two implementations may also be used in combination.

In still another implementation, the quantity of candidate PDCCHs may be adjusted based on a ratio of the quantities of symbols that are obtained before and after the second CORESET is adjusted. For example, as shown in Table 2, the quantity of symbols occupied by the second CORESET is 2, aggregation levels P are 1, 2, 4, and 8, and quantities of corresponding candidate PDCCHs are 6, 6, 2, and 2 respectively. If the first signaling indicates that the quantity of symbols of the second CORESET is 1, the quantities of candidate PDCCHs corresponding to the aggregation levels P of 1, 2, 4, and 8 may be 3, 3, 1, and 1 respectively.

TABLE 2

| Aggregation level | Quantity of symbols | Quantity of candidate PDCCHs |
|---|---|---|
| 1 | 1 | 3 |
| | 2 | 6 |
| | 3 | 9 |
| 2 | 1 | 3 |
| | 2 | 6 |
| | 3 | 9 |
| 4 | 1 | 1 |
| | 2 | 2 |
| | 3 | 3 |
| 8 | 1 | 1 |
| | 2 | 2 |
| | 3 | 3 |

In a possible implementation, the first signaling may be scrambled by using a first radio network temporary identifier (RNTI), and the first RNTI is an RNTI corresponding to the first signaling. In the foregoing implementation, the first signaling can be distinguished from other signaling, so that reliability of indicating a quantity of symbols of a CORESET can be improved.

Optionally, in this embodiment of this application, the second CORESET may use a high aggregation level, for example, 8 or 16. The high aggregation level helps improve reliability of the first signaling. Improving the reliability of the first signaling facilitates PDCCH scheduling, thereby improving communication performance.

Optionally, the second CORESET is not associated with one or more of the following search spaces: a search space formed by candidate PDCCHs for scheduling other system information, a search space formed by candidate PDCCHs for scheduling paging messages, and/or a random access search space, and a common search space. This manner helps reduce impact on another terminal device that does not adjust a CORESET or a terminal device that cannot receive CORESET adjustment signaling.

Embodiment 2: This embodiment of this application further provides a CORESET adjustment manner. The method includes: A network device may send, in a first CORESET or a second CORESET, second signaling to a terminal device, and the second signaling may indicate to monitor the second CORESET or a third CORESET. The third CORESET and the second CORESET have different quantities of symbols and/or frequency domain resources. The terminal device determines a monitored CORESET based on the second signaling.

For descriptions of the first CORESET and the second CORESET, refer to related descriptions in the method in FIG. 5. Details are not described herein again.

A manner of sending the second signaling in the first CORESET or the second CORESET is the same as a manner of sending first signaling. For details, refer to related descriptions in S601. Details are not described herein again.

This application provides two communication methods for a problem that there are a few available resources when a resource conflict occurs between an interleaved CORESET and a CORESET 0. The method may be performed by a communication device (for example, the terminal device or the network device), or may be performed by a chip or a circuit. The method may be applied to a scenario in which resources of the first CORESET and the second CORESET overlap. In this embodiment of this application, it may be considered that resources of two CORESETs overlap provided that there are overlapping resources on the two CORESETs.

Figure 10:
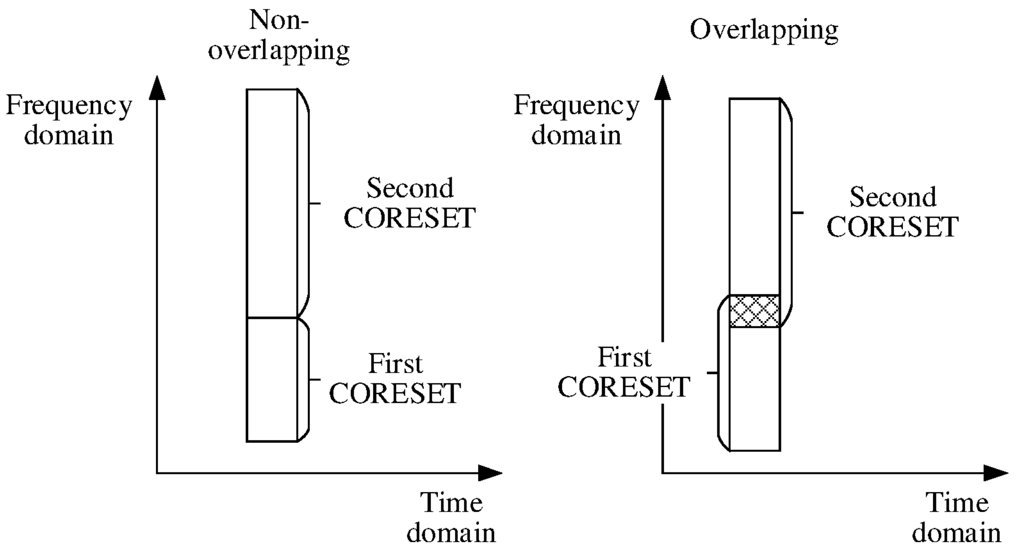
FIG. 10 is a schematic diagram in which a first CORESET overlaps a second CORESET according to an embodiment of this application.

Whether to interleave the second CORESET may be configured by using a higher layer parameter cce-REG-MappingType. FIG. 10 shows a case in which the resources of the first CORESET and the second CORESET overlap, and a case in which the resources of the first CORESET and the second CORESET do not overlap.

It should be noted that in this embodiment of this application, interleave mapping or non-interleave mapping may be performed on the first CORESET. This is not specifically limited herein.

Figure 11:
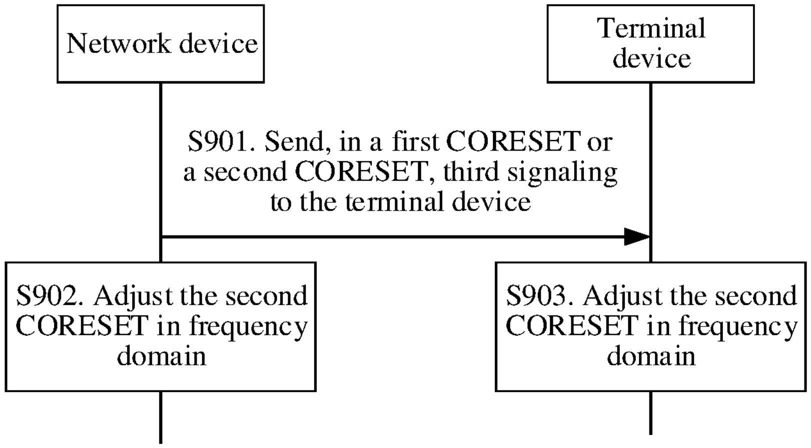
FIG. 11 is a schematic flowchart of a communication method according to an embodiment of this application.

Embodiment 3: As shown in FIG. 11, a communication method includes the following steps.

S901. A network device sends, in a first CORESET or a second CORESET, third signaling to a terminal device. Correspondingly, the terminal device receives, in the first CORESET or the second CORESET, the third signaling from the network device.

The third signaling indicates whether a resource that is in the second CORESET and that overlaps the first CORESET is available. Optionally, the third signaling may indicate whether the resource that is in the second CORESET and that overlaps the first CORESET is available when the first CORESET and the second CORESET are monitored simultaneously next time. In a possible implementation, if the third signaling is not received, it is considered by default that the resource that is in the second CORESET and that overlaps the first CORESET is unavailable.

In an implementation, before receiving next signaling that indicates whether the resource that is in the second CORESET and that overlaps the first CORESET is available, the terminal device may determine, based on an indication of the third signaling, whether the resource that is in the second CORESET and that overlaps the first CORESET is available.

If the resource that is in the second CORESET and that overlaps the first CORESET is unavailable, S902 and S903 are performed.

Optionally, that the first CORESET and the second CORESET of the terminal device overlap may be understood as that the first CORESET and the second CORESET of the terminal device overlap at a frequency domain location, and the terminal device monitors a PDCCH on both the first CORESET and the second CORESET in at least one symbol. In this case, the first CORESET and the second CORESET of the terminal device overlap in the at least one symbol.

For descriptions of the first CORESET and the second CORESET, refer to related descriptions in the method in FIG. 5. Details are not described herein again.

A manner of sending the third signaling in the first CORESET or the second CORESET is the same as a manner of sending first signaling. For details, refer to related descriptions in S601. Details are not described herein again.

Optionally, the network device may send the third signaling in another manner, for example, send the third signaling by using RRC signaling, or send the third signaling by using media access control control element (MAC CE) signaling. This is not specifically limited.

S902. The network device adjusts the second CORESET in frequency domain.

Figure 12:
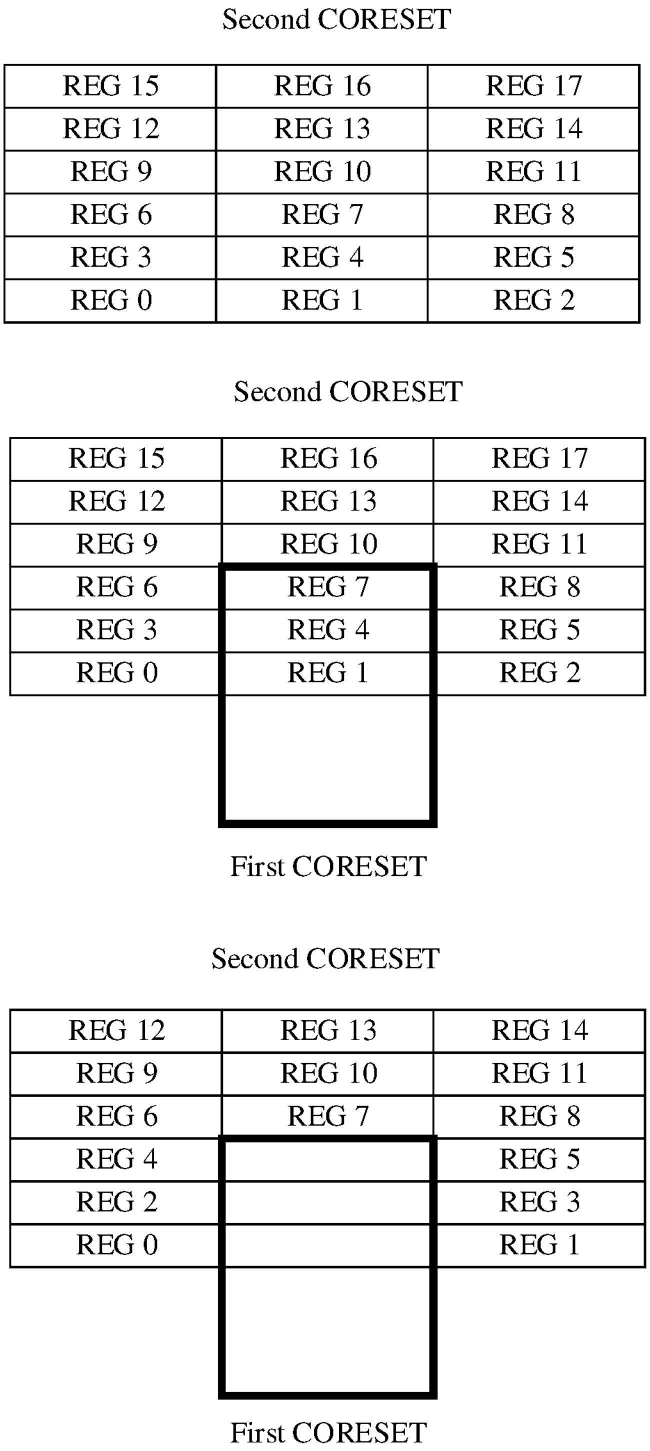
FIG. 12 is a schematic diagram of REG renumbering according to an embodiment of this application.

In an implementation, a REG that does not overlap the first CORESET and that is in the second CORESET may be renumbered, as shown in FIG. 12.

Figure 13:
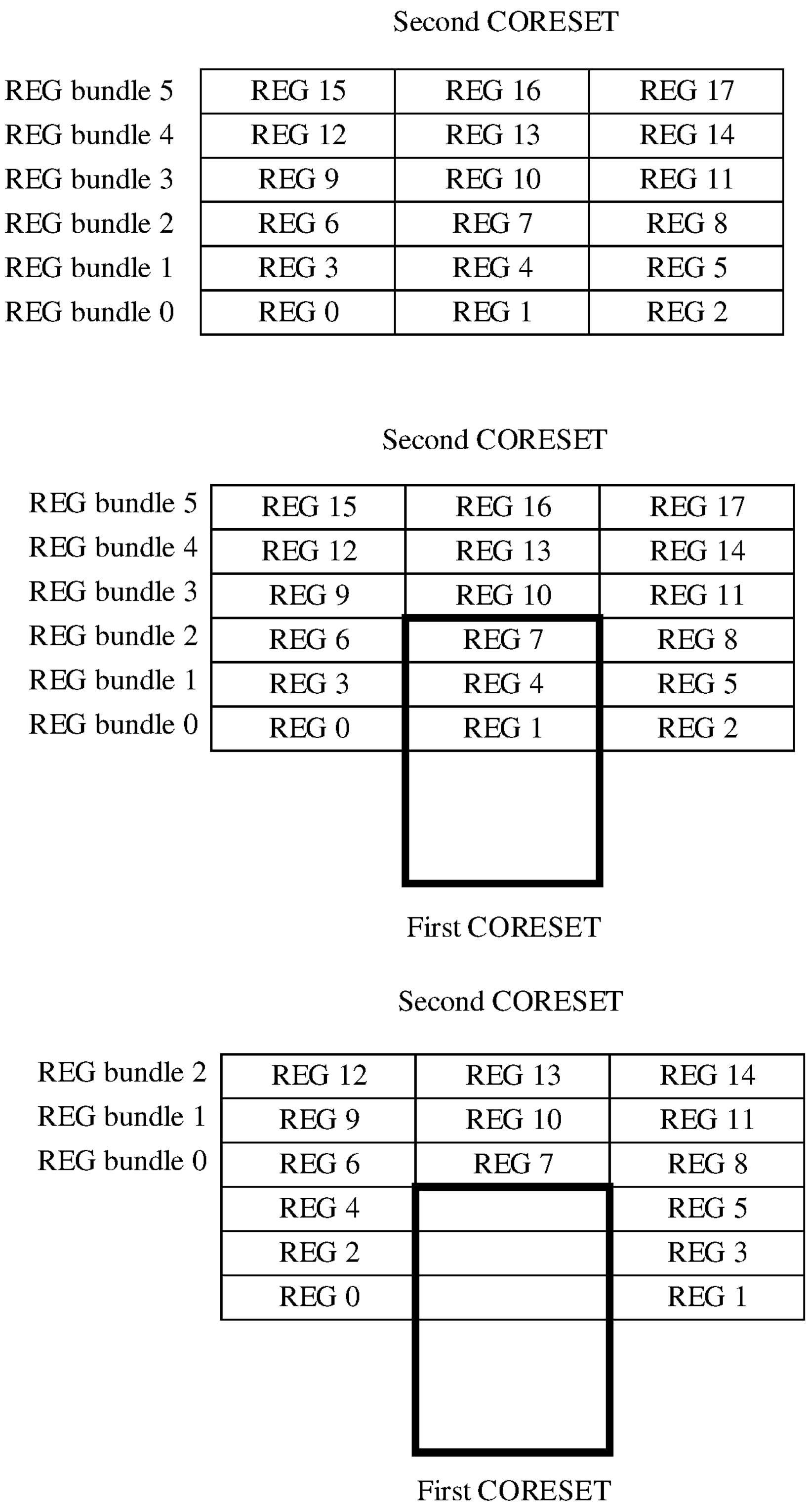
FIG. 13 is a schematic diagram of REG bundle renumbering according to an embodiment of this application.

In another implementation, a REG bundle that does not overlap the first CORESET and that is in the second CORESET may be renumbered, as shown in FIG. 13.

Specifically, at least two interleaving row values and/or at least two REG bundle length values may be configured for the second CORESET. When the REG bundle that does not overlap the first CORESET and that is in the second CORESET are renumbered, an interleaving row value R may be selected from at least one configured interleaving row value, a REG bundle length value L may be selected from at least one configured REG bundle length value, and the REG bundle that does not overlap the first CORESET and that is in the second CORESET are renumbered based on selected R and L. The selected R and L may make C an integer. For C, refer to related descriptions of the REG bundle in the foregoing term descriptions. In other words, R and L meet:

$$\frac{N_{REG}^{CORESET}}{L \times R}$$

is an integer, and $$N_{REG}^{CORESET}$$

is a total quantity of REGs of the REG bundle that does not overlap the first CORESET and that is in the second CORESET.

A manner of selecting R and L may be as follows: The network device may select a group of R and L. If the interleaving row value and the REG bundle length value do not meet that $$\frac{N_{REG}^{CORESET}}{L \times R}$$

is an integer, select a next group of R and L. If the group of R and L still does not meet:

$$\frac{N_{REG}^{CORESET}}{L \times R}$$

is an integer, a next group of R and L continues to be selected until R and L that meet that $$\frac{N_{REG}^{CORESET}}{L \times R}$$

is an integer are selected as a quantity of interleaving rows of the second CORESET and/or the length of the REG bundle. In this manner, the network device may configure the group of R and L as default values. When selecting R and L, the network device preferentially selects the default values.

Alternatively, an interleaving row value R and a REG bundle length value L may be configured for the second CORESET. When the REG bundle that does not overlap the first CORESET and that is in the second CORESET is renumbered, if L and R are configured, and calculated C is not an integer, n REG bundles may be discarded. For example, the n REG bundles may be discarded in ascending order (or in descending order) of identifiers of the REG bundles.

$$\frac{N_{REG}^{CORESET'}}{L \times R}$$

is an integer, $$N_{REG}^{CORESET'}$$

is a quantity of remaining REGs other than the n REG bundles in a first REG bundle, and the first REG bundle is a REG bundle that does not overlap the first CORESET and that is in the second CORESET. "Discarding the n REG bundles" may be understood as skipping the n REG bundles during the numbering, the n REG bundles do not participate in numbering, or the second CORESET does not include the n REG bundles.

Figure 14:
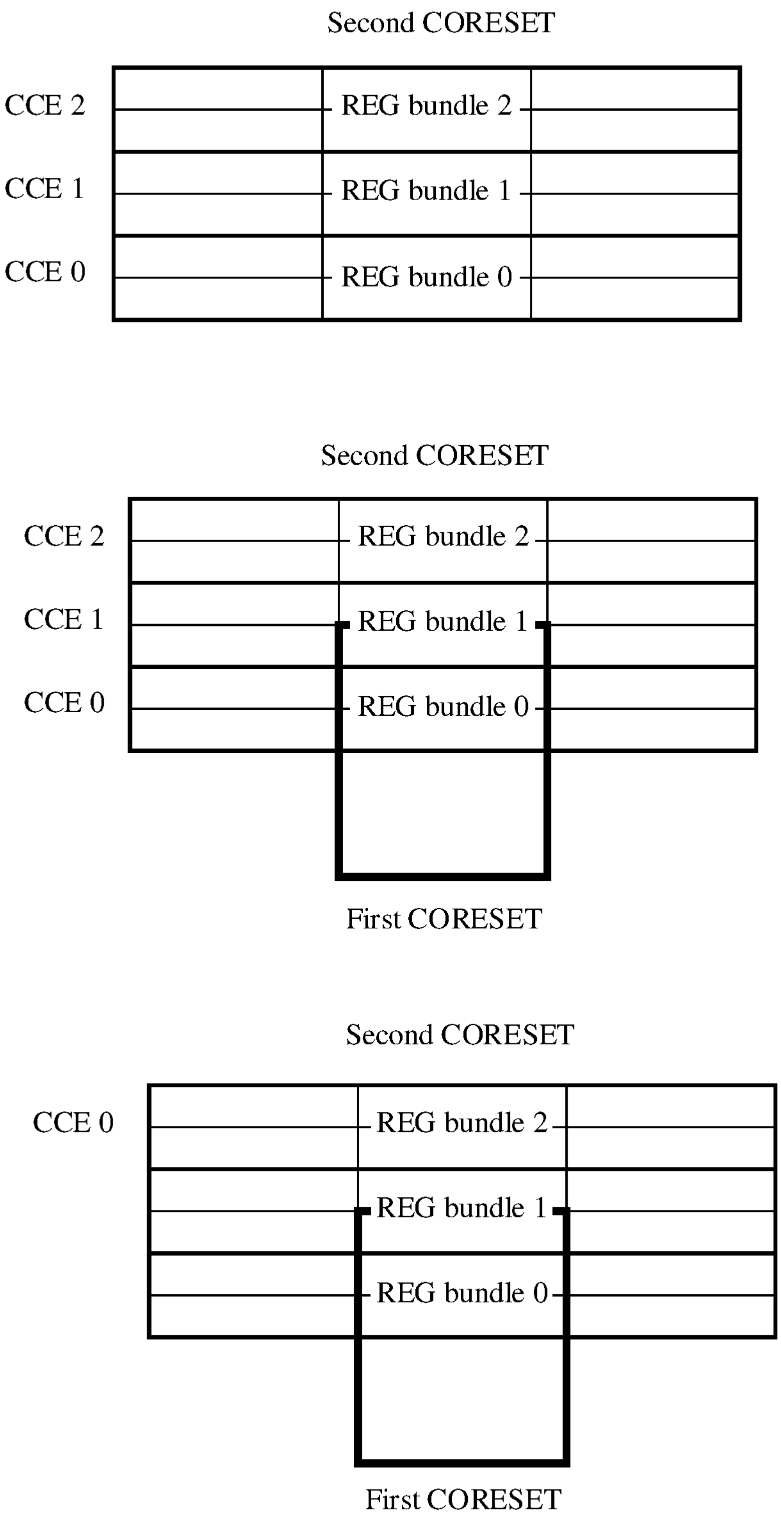
FIG. 14 is a schematic diagram of CCE renumbering according to an embodiment of this application.

In still another implementation, the REG bundle that does not overlap the first CORESET and that is in the second CORESET may alternatively be remapped to a CCE, as shown in FIG. 14. Alternatively, a CCE that does not overlap the first CORESET and that is in the second CORESET may be renumbered.

Optionally, in Embodiment 3 of this application, a quantity of candidate PDCCHs corresponding to an aggregation level in a search space associated with the second CORESET may alternatively be adjusted. For a specific manner, refer to Embodiment 1. Details are not described herein again.

It should be noted that there is no strict sequence for performing steps S901 and S902. This is not specifically limited herein.

S903. The terminal device adjusts the second CORESET in frequency domain.

A manner in which the network device adjusts the second CORESET is similar to a manner in which the terminal device adjusts the second CORESET. A specific adjustment manner is described in detail below.

Optionally, in this application, that the terminal device adjusts the second CORESET may be understood as that the terminal device monitors a PDCCH on the adjusted second CORESET.

Embodiment 4: Another communication method provided in this embodiment of this application includes: A network device sends fourth signaling to a terminal device in a first CORESET, a second CORESET, or a fourth CORESET. The fourth signaling further indicates to monitor one of the second CORESET and the fourth CORESET. The second CORESET overlaps the first CORESET, and the fourth CORESET does not overlap the first CORESET. The terminal device monitors the second CORESET or the fourth CORESET based on the fourth signaling.

The fourth signaling is sent in the first CORESET, so that transmission reliability of the fourth signaling can be improved. The fourth signaling is sent in the second CORESET or the fourth CORESET, so that flexibility can be improved.

In an implementation, if the first CORESET is not used, the fourth signaling may indicate to monitor the second CORESET; or if the first CORESET is used, fourth signaling may indicate to monitor the fourth CORESET.

For descriptions of the first CORESET and the second CORESET, refer to related descriptions in the method in FIG. 5. Details are not described herein again.

A manner of sending the fourth signaling in the first CORESET, the second CORESET, or the fourth CORESET is the same as a manner of sending first signaling. For details, refer to related descriptions in S601. Details are not described herein again.

Optionally, the network device may send the fourth signaling in another manner, for example, send the fourth signaling by using RRC signaling, or send the fourth signaling by using MAC CE signaling. This is not specifically limited in this application.

It should be noted that the foregoing Embodiment 1 to Embodiment 4 may be used as independent solutions for implementation, or one of Embodiment 1 and Embodiment 2 and one of Embodiment 3 and Embodiment 4 may be combined as a solution for implementation. For example, Embodiment 1 and Embodiment 3 are combined as a solution for implementation. It may be understood that in the combined solution, the first signaling and third signaling may be two pieces of signaling, or may be same signaling. For another example, Embodiment 2 and Embodiment 4 are combined as a solution for implementation. It may be understood that in the combined solution, the second signaling and the fourth signaling may be two pieces of signaling, or may be same signaling. For still another example, Embodiment 1 and Embodiment 4 are combined as a solution for implementation. It may be understood that in the combined solution, the first signaling and the fourth signaling may be two pieces of signaling, or may be same signaling. For yet another example, Embodiment 2 and Embodiment 3 are combined as a solution for implementation. It may be understood that in the combined solution, the second signaling and the third signaling may be two pieces of signaling, or may be same signaling.

Based on any one of Embodiment 1 to Embodiment 4, in an optional implementation, the terminal device may notify, in a capability reporting manner or an assistance information reporting manner, the network device whether the terminal device supports adjustment of a CORESET time-frequency resource by using the first signaling (or the second signaling, the third signaling, or the fourth signaling). Optionally, before the terminal device reports a capability or assistance information, the network device may notify the terminal device whether to report the capability or the assistance information.

In another optional implementation, the network device may configure the terminal device whether the network device adjusts the second CORESET by using the first signaling (or the second signaling, the third signaling, or the fourth signaling).

In an implementation, the network device may indicate, to the terminal device in an implicit indication manner, that the network device adjusts the second CORESET by using the first signaling (or the second signaling, the third signaling, or the fourth signaling). For example, the network device may perform indication by using one or more of the following configurations: configuring at least two interleaving row values and at least two REG bundle length values for the second CORESET, configuring a quantity of at least two candidate PDCCHs for at least one aggregation level in a search space associated with the second control resource set, and configuring a maximum quantity of candidate PDCCHs for at least one aggregation level in a search space associated with the second control resource set.

In another implementation, the network device may indicate, in an explicit indication manner, to the terminal device that the network device adjusts the second CORESET by using the first signaling (or the second signaling, the third signaling, or the fourth signaling). For example, the network device may indicate, by using an RRC parameter, to the terminal device that the network device adjusts the second CORESET by using the first signaling (or the second signaling, the third signaling, or the fourth signaling).

Optionally, a quantity of candidate PDCCHs of at least one aggregation level corresponding to the first signaling (or the second signaling, the third signaling, or the fourth signaling) is 1, or blind detection is performed on the first signaling (or the second signaling, the third signaling, or the fourth signaling) only once. This helps reduce impact on a blind detection capability of the terminal device.

In addition, in any one of Embodiment 1 to Embodiment 4, the terminal device in an idle state and/or the terminal device in an inactive state may not monitor the first signaling (or the second signaling, the third signaling, or the fourth signaling). This manner helps reduce a monitoring amount of the terminal device in an idle state and/or the terminal device in an inactive state. This helps save energy of the terminal device.

Figure 15:
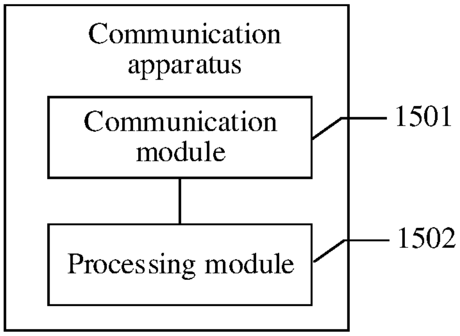
FIG. 15 is a schematic diagram of an architecture of a network system according to an embodiment of this application.

Based on a same inventive concept as the method embodiments, an embodiment of this application provides a communication apparatus. A structure of the communication apparatus may be shown in FIG. 15, and the communication apparatus includes a communication module 1501 and a processing module 1502.

In an implementation, the communication apparatus may be specifically configured to implement the methods performed by the terminal device in embodiments shown in FIG. 5 to FIG. 14. The apparatus may be the terminal device, or may be a chip, a chip group in the terminal device, or a part of a chip that is configured to perform a related method function. The communication module 1501 is configured to receive, in a first control resource set or a second control resource set, first signaling from a network device. The first signaling indicates a quantity of symbols occupied by the second control resource set. The processing module 1502 is configured to adjust the second control resource set based on the first signaling.

In an implementation, the processing module 1502 is specifically configured to determine, based on the first signaling, a quantity R of interleaving rows of the second control resource set, and/or a length L of a REG bundle of the second control resource set. At least two interleaving row values are configured for the second control resource set, and/or at least two REG bundle length values are configured for the second control resource set.

For example, a quantity of RBs of the second control resource set cannot be exactly divided by 12 and/or 18.

For example, there is a correspondence between R and the quantity of symbols indicated by the first signaling; and/or there is a correspondence between L and the quantity of symbols indicated by the first signaling.

Optionally, a quantity of candidate PDCCHs corresponding to at least one aggregation level is configured in a search space associated with the second control resource set, and a first aggregation level in the at least one aggregation level is corresponding to a quantity of at least two candidate PDCCHs; and/or a maximum quantity of candidate PDCCHs corresponding to at least one aggregation level is configured in a search space associated with the second control resource set.

Optionally, the first signaling further indicates whether a resource that overlaps the first control resource set and that is in the second control resource set is available.

Optionally, the first signaling indicates that the resource that overlaps the first control resource set and that is in the second control resource set is unavailable. The processing module 1502 is further configured to: renumber a REG that does not overlap the first control resource set and that is in the second control resource set; renumber a REG bundle that does not overlap the first control resource set and that is in the second control resource set; or remap a REG bundle that does not overlap the first control resource set and that is in the second control resource set to a CCE.

When renumbering the REG bundle that does not overlap the first control resource set and that is in the second control resource set, the processing module 1502 may be specifically configured to renumber, based on the quantity R of interleaving rows and the length L of the REG bundle, the REG bundle that does not overlap the first control resource set and that is in the second control resource set.

$$\frac{N_{REG}^{CORESET}}{L \times R}$$

is an integer, $$N_{REG}^{CORESET}$$

is a total quantity of REGs of the REG bundle that does not overlap the first control resource set and that is in the second control resource set, the at least two interleaving row values are configured for the second control resource set, and/or the at least two REG bundle length values are configured for the second control resource set.

Alternatively, the REG bundle that does not overlap the first control resource set and that is in the second control resource set is renumbered, and n REG bundles are skipped during the renumbering.

$$\frac{N_{REG}^{CORESET'}}{L \times R}$$

is an integer, $$N_{REG}^{CORESET'}$$

is a quantity of remaining REGs other than the n REG bundles in a first REG bundle, and the first REG bundle is the REG bundle that does not overlap the first control resource set and that is in the second control resource set.

For example, the first signaling further indicates to monitor one of the second control resource set and a third control resource set. The second control resource set overlaps first control resource set, and the third control resource set does not overlap the first control resource set.

When adjusting the second control resource set based on the first signaling, the processing module 1502 may be specifically configured to adjust, starting from a first slot, a quantity of symbols of the second control resource set to the quantity of symbols indicated by the first signaling. The first slot is a slot in which the first signaling is received.

Optionally, if the first signaling occupies one symbol in time domain, and the first signaling indicates that the quantity of symbols occupied by the second control resource set is 1, after the quantity of symbols of the second control resource set is adjusted to the quantity of symbols indicated by the first signaling, the processing module 1502 is further configured to renumber other REGs other than a first resource in the adjusted second control resource set, where the first resource is a REG occupied by the first signaling.

If the first signaling occupies one symbol in time domain, and the first signaling indicates that the quantity of symbols occupied by the second control resource set is greater than 1, after the quantity of symbols of the second control resource set is adjusted to the quantity of symbols indicated by the first signaling, the processing module 1502 is further configured to: number other REGs other than a second resource in the adjusted second control resource set, where the second resource is the same as a resource occupied by the first signaling in frequency domain, and the second resource is the same as a symbol occupied by the adjusted second control resource set in time domain; or number other REGs other than a first resource in the adjusted second control resource set, where the first resource is a REG occupied by the first signaling.

For example, when the other REGs other than the first resource in the adjusted second control resource set are numbered, m REGs in the other REGs other than the first resource in the second resource do not participate in the numbering. m is a remainder obtained by performing a modulo operation on a quantity of the REGs other than the first resource in the second resource by the length of the REG bundle.

For example, the first signaling includes N pieces of sub information, each piece of sub information occupies M RBs in the second control resource set, a minimum identifier of an RB occupied by each piece of sub information is an integer multiple of p, M is an integer multiple of p, p is an integer greater than 1, a quantity of symbols of the first signaling is different from the quantity of symbols of the second control resource set, and N is an integer greater than 1.

If a quantity of symbols occupied by the first signaling in time domain is the same as the quantity of symbols of the second control resource set, and the quantity of symbols indicated by the first signaling is less than the quantity of symbols occupied by the first signaling in time domain, after the quantity of symbols of the second control resource set is adjusted to the quantity of symbols indicated by the first signaling, the processing module 1502 is further configured to renumber other CCEs other than a third resource in the second control resource set, where the third resource is a CCE occupied by the first signaling.

In an implementation, when adjusting the second control resource set based on the first signaling, the processing module 1502 is specifically configured to adjust, starting from a next slot of a first slot, a quantity of symbols of the second control resource set to the quantity of symbols indicated by the first signaling. The first slot is the slot in which the first signaling is received.

For example, the first signaling is scrambled by using a first RNTI, and the first RNTI is an RNTI corresponding to the first signaling.

In a possible design, the first control resource set is a common control resource set, and the second control resource set is a terminal device-specific control resource set; an identifier of the first control resource set is 0, and an identifier of the second control resource set is greater than 0; the second control resource set is a control resource set configured by using terminal device-specific signaling, and the first control resource set is a control resource set configured by using a physical broadcast channel or system information; or the first control resource set is for monitoring a PDCCH in an idle state, and the second control resource set is for monitoring a PDCCH in a non-idle state.

In an implementation, the communication apparatus may be specifically configured to implement the methods performed by the network device in embodiments shown in FIG. 5 to FIG. 12. The apparatus may be the network device, or may be a chip, a chip group in the network device, or a part of a chip that is configured to perform a related method function. The communication module 1501 is configured to send, in a first control resource set or a second control resource set, first signaling to a terminal device. The first signaling indicates a first quantity of symbols occupied by the second control resource set. The processing module 1502 is further configured to adjust the second control resource set based on the first quantity of symbols.

When adjusting the second control resource set based on the first signaling, the processing module 1502 is specifically configured to determine, based on configuration information, a quantity R of interleaving rows of the second control resource set, and/or a length L of a resource element group REG bundle of the second control resource set. At least two interleaving row values are configured for the second control resource set, and/or at least two REG bundle length values are configured for the second control resource set.

For example, a quantity of RBs of the second control resource set cannot be exactly divided by 12 and/or 18.

For example, there is a correspondence between the at least two interleaving row values and a quantity of symbols of the second control resource set; and/or there is a correspondence between the at least two REG bundle length values and the quantity of symbols of the second control resource set.

For example, a quantity of candidate physical downlink control channel PDCCHs corresponding to at least one aggregation level is configured in a search space associated with the second control resource set, and a first aggregation level in the at least one aggregation level is corresponding to a quantity of at least two candidate PDCCHs; and/or a maximum quantity of candidate PDCCHs corresponding to at least one aggregation level is configured in a search space associated with the second control resource set.

For example, the first signaling further indicates whether the resource that overlaps the first control resource set and that is in the second control resource set is available.

If the first signaling indicates that the resource that overlaps the first control resource set and that is in the second control resource set is unavailable, the processing module 1502 is further configured to: renumber a REG that does not overlap the first control resource set and that is in the second control resource set; renumber a REG bundle that does not overlap the first control resource set and that is in the second control resource set; or remap a REG bundle that does not overlap the first control resource set and that is in the second control resource set to the CCE.

When renumbering the REG bundle that does not overlap the first control resource set and that is in the second control resource set, the processing module 1502 includes: renumbering, based on the quantity R of interleaving rows and the length L of the REG bundle, the REG bundle that does not overlap the first control resource set and that is in the second control resource set, where $$\frac{N_{REG}^{CORESET}}{L \times R}$$

is an integer, $$N_{REG}^{CORESET}$$

is a total quantity of REGs of the REG bundle that does not overlap the first control resource set and that is in the second control resource set, the at least two interleaving row values are configured for the second control resource set, and/or the at least two REG bundle length values are configured for the second control resource set; or renumbering the REG bundle that does not overlap the first control resource set and that is in the second control resource set, and skipping n REG bundles during the renumbering, where $$\frac{N_{REG}^{CORESET'}}{L \times R}$$

is an integer, and $$N_{REG}^{CORESET'}$$

is a quantity of remaining REGs other than the n REG bundles in a first REG bundle, and the first REG bundle is the REG bundle that does not overlap the first control resource set and that is in the second control resource set.

For example, the first signaling further indicates to monitor one of the second control resource set and the third control resource set. The second control resource set overlaps the first control resource set, and the third control resource set does not overlap the first control resource set.

For example, if the first control resource set is not used, the first signaling indicates to monitor the second control resource set; or if the first control resource set is used, the first signaling indicates to monitor the third control resource set.

When adjusting the second control resource set based on the first signaling, the processing module 1502 is specifically configured to adjust, starting from a first slot, a quantity of symbols of the second control resource set to the quantity of symbols indicated by the first signaling. The first slot is a slot in which the first signaling is received.

Optionally, if the first signaling occupies one symbol in time domain, and the first signaling indicates that the quantity of symbols occupied by the second control resource set is 1, after the quantity of symbols of the second control resource set is adjusted to the quantity of symbols indicated by the first signaling, the processing module 1502 is further configured to renumber other REGs other than a first resource in the adjusted second control resource set, where the first resource is a REG occupied by the first signaling.

If the first signaling occupies one symbol in time domain, and the first signaling indicates that the quantity of symbols occupied by the second control resource set is greater than 1, after the quantity of symbols of the second control resource set is adjusted to the quantity of symbols indicated by the first signaling, the processing module 1502 is further configured to: number other REGs other than a second resource in the adjusted second control resource set, where the second resource is the same as a resource occupied by the first signaling in frequency domain, and the second resource is the same as a symbol occupied by the adjusted second control resource set in time domain; or number other REGs other than a first resource in the adjusted second control resource set, where the first resource is a REG occupied by the first signaling.

For example, when the other REGs other than the first resource in the adjusted second control resource set are numbered, m REGs in the other REGs other than the first resource in the second resource do not participate in the numbering. m is the remainder obtained by performing the modulo operation on a quantity of the REGs other than the first resource in the second resource by the length of the REG bundle.

For example, the first signaling includes N pieces of sub information, each piece of sub information occupies M resource blocks RBs in the second control resource set, a minimum identifier of an RB occupied by each piece of sub information is an integer multiple of p, M is an integer multiple of p, p is an integer greater than 1, a quantity of symbols of the first signaling is different from the quantity of symbols of the second control resource set, and N is an integer greater than 1.

Optionally, if a quantity of symbols occupied by the first signaling in time domain is the same as the quantity of symbols of the second control resource set, and the quantity of symbols indicated by the first signaling is less than the quantity of symbols occupied by the first signaling in time domain, after the quantity of symbols of the second control resource set is adjusted to the quantity of symbols indicated by the first signaling, the processing module 1502 is further configured to renumber other CCEs other than a third resource in the second control resource set, where the third resource is a CCE occupied by the first signaling.

When adjusting the second control resource set based on the first signaling, the processing module 1502 is specifically configured to adjust, starting from a next slot, a quantity of symbols of the second control resource set to the quantity of symbols indicated by the first signaling.

For example, the first signaling is scrambled by using the first RNTI, and the first RNTI is the RNTI corresponding to the first signaling.

In a possible design, the first control resource set is the common control resource set, and the second control resource set is the terminal device-specific control resource set; the identifier of the first control resource set is 0, and the identifier of the second control resource set is greater than 0; the second control resource set is a control resource set configured by using the terminal device-specific signaling, and the first control resource set is the control resource set configured by using the physical broadcast channel or system information; or the first control resource set is for monitoring the PDCCH in the idle state, and the second control resource set is for monitoring the PDCCH in the non-idle state.

Division into the modules in embodiments of this application is an example, is merely division into logical functions, and may be other division during actual implementation. In addition, functional modules in embodiments of this application may be integrated into one processor, or may exist alone physically, or two or more modules may be integrated into one module. The integrated module may be implemented in a form of hardware, or may be implemented in a form of a software functional module. It may be understood that for functions or implementations of the modules in this embodiment of this application, further refer to related descriptions in the method embodiments.

Figure 16:
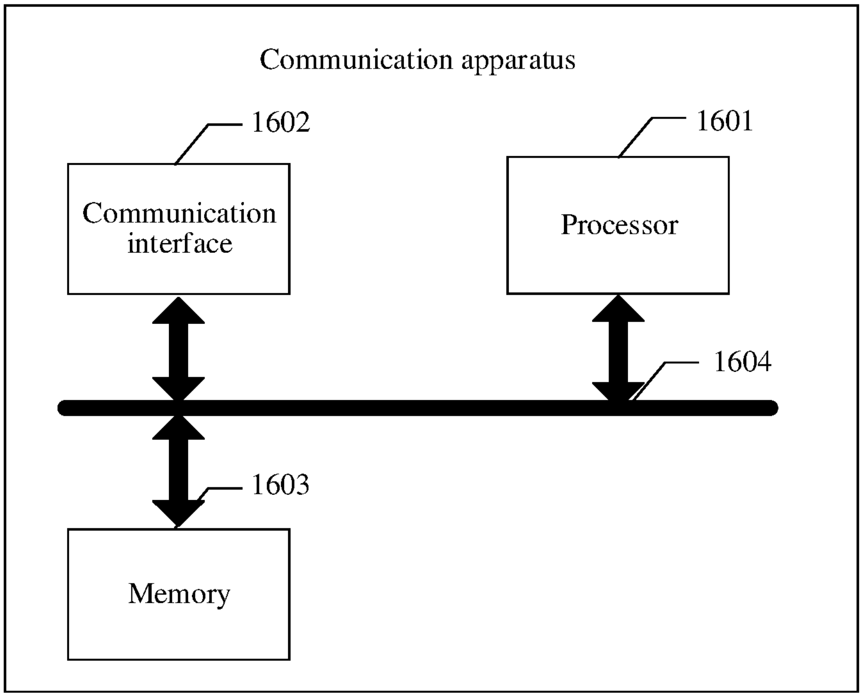
FIG. 16 is a schematic diagram of an architecture of a network system according to an embodiment of this application.

In a possible manner, the communication apparatus may be shown in FIG. 16. The apparatus may be a communication device or a chip in the communication device. The communication device may be the terminal device in the foregoing embodiment or the network device in the foregoing embodiment. The apparatus includes a processor 1601 and a communication interface 1602, and may further include a memory 1603. The processing module 1502 may be the processor 1601. The communication module 1501 may be the communication interface 1602.

The processor 1601 may be a CPU, a digital processing unit, or the like. The communication interface 1602 may be a transceiver, an interface circuit such as a transceiver circuit, a transceiver chip, or the like. The apparatus further includes a memory 1603, configured to store a program executed by the processor 1601. The memory 1603 may be a nonvolatile memory such as a hard disk drive (HDD) or a solid-state drive (SSD), or may be a volatile memory such as a random-access memory (RAM). The memory 1603 is any other medium that can be used to carry or store expected program code in a form of instructions or a data structure and that can be accessed by a computer, but is not limited thereto.

The processor 1601 is configured to execute program code stored in the memory 1603, and is specifically configured to perform an action of the processing module 1502. Details are not described herein in this application. The communication interface 1602 is configured to perform an action of communication module 1501. Details are not described herein in this application.

In this embodiment of this application, a specific connection medium between the communication interface 1602, the processor 1601, and the memory 1603 is not limited. In this embodiment of this application, the memory 1603, the processor 1601, and the communication interface 1602 are connected through a bus 1604 in FIG. 16, and the bus is represented by a thick line in FIG. 16. A connection manner between other components is only schematically described, and is not limited thereto. Buses may be classified into an address bus, a data bus, a control bus, and the like. For ease of descriptions, the bus in FIG. 16 is represented by only one thick line, but which does not indicate that there is only one bus or one type of bus.

An embodiment of the present invention further provides a computer-readable storage medium, configured to store computer software instructions that need to be executed for execution of the foregoing processor, and the computer-readable storage medium includes a program that needs to be executed for execution of the foregoing processor.

An embodiment of this application further provides a communication system, including a communication apparatus configured to implement a function of the terminal device in Embodiment 1 and a communication apparatus configured to implement a function of the network device in Embodiment 1.

An embodiment of this application further provides a communication system, including a communication apparatus configured to implement a function of the terminal device in Embodiment 2 and a communication apparatus configured to implement a function of the network device in Embodiment 2.

An embodiment of this application further provides a communication system, including a communication apparatus configured to implement a function of the terminal device in Embodiment 3 and a communication apparatus configured to implement a function of the network device in Embodiment 3.

An embodiment of this application further provides a communication system, including a communication apparatus configured to implement a function of the terminal device in Embodiment 4 and a communication apparatus configured to implement a function of the network device in Embodiment 4.

A person skilled in the art should understand that embodiments of this application may be provided as a method, a system, or a computer program product. Therefore, this application may use a form of hardware only embodiments, software only embodiments, or embodiments with a combination of software and hardware. In addition, this application may use a form of a computer program product that is implemented on one or more computer-usable storage media (including but not limited to a disk memory, a CD-ROM, an optical memory, and the like) that include computer-usable program code.

This application is described with reference to flowcharts and/or block diagrams of the method, the device (system), and the computer program product according to this application. It should be understood that computer program instructions may be used to implement each process and/or each block in the flowcharts and/or block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer-readable memory that can indicate the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

The computer program instructions may alternatively be loaded onto a computer or another programmable data processing device, so that a series of operations and steps are performed on the computer or the another programmable device, to generate computer-implemented processing. Therefore, the instructions executed on the computer or the another programmable device provide steps for implementing a specific function in one or more procedures in the flowcharts and/or in one or more blocks in the block diagrams.

It is clearly that a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A method, comprising:

receiving, in a first control resource set or a second control resource set, first signaling from a network device, wherein the first signaling indicates a quantity of symbols occupied by the second control resource set; and adjusting the second control resource set based on the first signaling, wherein adjusting the second control resource set based on the first signaling comprises:

determining, based on the first signaling, a quantity R of interleaving rows of the second control resource set, or a length L of a resource element group (REG) bundle of the second control resource set;

wherein at least two interleaving row values are configured for the second control resource set, or at least two REG bundle length values are configured for the second control resource set; and wherein a quantity of resource blocks (RBs) of the second control resource set cannot be exactly divided by 12 or 18.

2. The method according to claim 1, wherein:

there is a correspondence between R and the quantity of symbols indicated by the first signaling; or there is a correspondence between L and the quantity of symbols indicated by the first signaling.

3. The method according to claim 1, wherein:

a quantity of candidate physical downlink control channels (PDCCHs) corresponding to at least one aggregation level is configured in a search space associated with the second control resource set, and a first aggregation level in the at least one aggregation level corresponds to a quantity of at least two candidate PDCCHs; or a maximum quantity of candidate PDCCHs corresponding to at least one aggregation level is configured in a search space associated with the second control resource set.

4. The method according to claim 1, wherein:

the first signaling further indicates whether a resource that overlaps the first control resource set and that is in the second control resource set is available.

5. The method according to claim 1, wherein:

the first signaling further indicates to monitor one of the second control resource set and a third control resource set, the second control resource set overlaps the first control resource set, and the third control resource set does not overlap the first control resource set.

6. A method, comprising:

sending, in a first control resource set or a second control resource set, first signaling to a terminal device, wherein the first signaling indicates a first quantity of symbols occupied by the second control resource set; and adjusting the second control resource set based on the first quantity of symbols, wherein adjusting the second control resource set based on the first signaling comprises:

determining, based on configuration information, a quantity R of interleaving rows of the second control resource set, or a length L of a resource element group (REG) bundle of the second control resource set;

wherein at least two interleaving row values are configured for the second control resource set, or at least two REG bundle length values are configured for the second control resource set; and wherein a quantity of resource blocks (RBs) of the second control resource set cannot be exactly divided by 12 or 18.

7. The method according to claim 6, wherein:

there is a correspondence between R and a quantity of symbols of the second control resource set; or there is a correspondence between L and the quantity of symbols of the second control resource set.

8. The method according to claim 6, wherein:

a quantity of candidate physical downlink control channels (PDCCHs) corresponding to at least one aggregation level is configured in a search space associated with the second control resource set, and a first aggregation level in the at least one aggregation level corresponds to a quantity of at least two candidate PDCCHs; or a maximum quantity of candidate PDCCHs corresponding to at least one aggregation level is configured in a search space associated with the second control resource set.

9. The method according to claim 6, wherein:

the first signaling further indicates whether a resource that overlaps the first control resource set and that is in the second control resource set is available.

10. The method according to claim 6, wherein:

the first signaling further indicates to monitor one of the second control resource set and a third control resource set, the second control resource set overlaps the first control resource set, and the third control resource set does not overlap the first control resource set.

11. An apparatus, comprising:

one or more processors in communication with a non-transitory memory storing computer instructions, wherein the instructions, when executed by the one or more processors, cause the apparatus to:

receive, in a first control resource set or a second control resource set, first signaling from a network device, wherein the first signaling indicates a quantity of symbols occupied by the second control resource set; and adjust the second control resource set based on the first signaling, wherein the instructions, when executed by the one or more processors, cause the apparatus to:

determine, based on the first signaling, a quantity R of interleaving rows of the second control resource set, or a length L of a resource element group (REG) bundle of the second control resource set;

wherein at least two interleaving row values are configured for the second control resource set, or at least two REG bundle length values are configured for the second control resource set; and wherein a quantity of resource blocks (RBs) of the second control resource set cannot be exactly divided by 12 or 18.

12. The apparatus according to claim 11, wherein:

there is a correspondence between R and the quantity of symbols indicated by the first signaling; or there is a correspondence between L and the quantity of symbols indicated by the first signaling.

13. The apparatus according to claim 11, wherein:

a quantity of candidate physical downlink control channels (PDCCHs) corresponding to at least one aggregation level is configured in a search space associated with the second control resource set, and a first aggregation level in the at least one aggregation level is corresponding to a quantity of at least two candidate PDCCHs; or a maximum quantity of candidate PDCCHs corresponding to at least one aggregation level is configured in a search space associated with the second control resource set.

14. The apparatus according to claim 11, wherein:

the first signaling further indicates whether a resource that overlaps the first control resource set and that is in the second control resource set is available.

15. The apparatus according to claim 11, wherein:

the first signaling further indicates to monitor one of the second control resource set and a third control resource set, the second control resource set overlaps the first control resource set, and the third control resource set does not overlap the first control resource set.

16. An apparatus, comprising:

one or more processors in communications with a non-transitory memory storing computer instructions, wherein the instructions, when executed by the one or more processors, cause the apparatus to:

send, in a first control resource set or a second control resource set, first signaling to a terminal device, wherein the first signaling indicates a first quantity of symbols occupied by the second control resource set; and adjust the second control resource set based on the first quantity of symbols, wherein the instructions, when executed by the one or more processors, cause the apparatus to:

determine, based on configuration information, a quantity R of interleaving rows of the second control resource set, or a length L of a resource element group (REG) bundle of the second control resource set;

wherein at least two interleaving row values are configured for the second control resource set, or at least two REG bundle length values are configured for the second control resource set; and wherein a quantity of resource blocks (RBs) of the second control resource set cannot be exactly divided by 12 or 18.

17. The apparatus according to claim 16, wherein:

there is a correspondence between the at least two interleaving row values and a quantity of symbols of the second control resource set; or there is a correspondence between the at least two REG bundle length values and the quantity of symbols of the second control resource set.

18. The apparatus according to claim 16, wherein:

a quantity of candidate physical downlink control channels (PDCCHs) corresponding to at least one aggregation level is configured in a search space associated with the second control resource set, and a first aggregation level in the at least one aggregation level corresponds to a quantity of at least two candidate PDCCHs; or a maximum quantity of candidate PDCCHs corresponding to at least one aggregation level is configured in a search space associated with the second control resource set.

19. The apparatus according to claim 16, wherein:

the first signaling further indicates whether a resource that overlaps the first control resource set and that is in the second control resource set is available.

20. The apparatus according to claim 16, wherein:

the first signaling further indicates to monitor one of the second control resource set and a third control resource set, the second control resource set overlaps the first control resource set, and the third control resource set does not overlap the first control resource set.

* * * * *